US005107128A

United States Patent [19]

Davall et al.

[11] Patent Number: 5,107,128

[45] Date of Patent: Apr. 21, 1992

[54] METHOD AND APPARATUS FOR DETECTING FLAME WITH ADJUSTABLE OPTICAL COUPLING

[75] Inventors: Peter W. N. Davall, White City; John D. Spencer, Halifax, both of Canada

[73] Assignee: Saskatchewan Power Corporation, Regina, Canada; a part interest

[21] Appl. No.: 610,380

[22] Filed: Nov. 6, 1990

Related U.S. Application Data

[62] Division of Ser. No. 348,685, May 5, 1989, Pat. No. 4,983,853.

[51] Int. Cl.[5] .......... G01J 3/50; G08B 17/12

[52] U.S. Cl. .......... 250/554; 250/216; 250/226; 340/578

[58] Field of Search .......... 250/554, 342, 226, 216, 250/339; 340/578; 356/315

[56] References Cited

U.S. PATENT DOCUMENTS

| | | | |
|---|---|---|---|
| 3,444,544 | 5/1969 | Pearson et al. | 340/578 |
| 3,689,773 | 9/1972 | Wheeler | 250/554 |
| 3,708,674 | 1/1973 | Trimpi et al. | 250/554 |
| 4,280,058 | 7/1981 | Tar | 250/554 |
| 4,370,557 | 1/1983 | Axmark et al. | 250/554 |
| 4,464,575 | 8/1984 | Cholin et al. | 250/554 |
| 4,603,255 | 7/1986 | Henry et al. | 250/339 |
| 4,671,362 | 6/1987 | Odashima | 340/578 |
| 4,710,630 | 12/1987 | Kuppenheimer, Jr. et al. | 250/339 |
| 4,713,544 | 12/1987 | Grage | 250/342 |

FOREIGN PATENT DOCUMENTS

| | | | |
|---|---|---|---|
| 0142099 | 11/1979 | Japan | 340/578 |
| 0038429 | 2/1986 | Japan | 340/578 |
| 1322708 | 7/1973 | United Kingdom | 340/578 |

*Primary Examiner*—David C. Nelms
*Assistant Examiner*—Michael Messinger
*Attorney, Agent, or Firm*—Barrigar & Oyen

[57] ABSTRACT

A method of detecting flame within a region where flame is expected. Radiation emissions from the region are measured within selected portions of the visible and infra-red frequency bands. Spectral characteristics of the two measurements, including their auto spectra, coherency and transfer function, are derived. The derived spectral characteristics are compared with prestored spectral signatures representative of the spectral characteristics of radiation emitted from the region within the selected portions of the visible and infra-red frequency bands while known flame conditions prevail within the region—thereby estimating the deviation of the derived spectral characteristics from the prestored spectral signatures. The deviations aforesaid are compared with predetermined threshold alarm values to assess the presence or absence of flame.

15 Claims, 17 Drawing Sheets

METHOD AND APPARATUS FOR DETECTING FLAME WITH ADJUSTABLE OPTICAL COUPLING

This is a division of application Ser. No. 07/348,685 filed on May 5, 1989, now U.S. Pat. No. 4,983,853.

FIELD OF THE INVENTION

This application pertains to a method and apparatus for detecting flame and is particularly adapted to flame detection in large boilers.

BACKGROUND OF THE INVENTION

Large boilers, for example, those used in conjunction with steam turbines for electric power generation, are fired by fuels such as coal, oil, gas or liquor. Supporting igniter burners are typically associated with each of the main burners. Because the igniter burners are typically fired with relatively expensive fuels, they are operated only intermittently. More particularly, the igniter burners are preferably fired only upon initial start up of the boiler and thereafter they are only selectably fired for short intervals to light off or support flame at the particular main burner(s) associated with the igniter burner(s).

The prior art has evolved a variety of flame detection techniques for monitoring boiler fires to detect the presence or absence of flame in the boiler regions supported by the various igniter burners. If flames are extinguished in a particular region of the boiler, then the "no flame" condition must be quickly identified or else the main burners continue to supply fuel which may potentially explode if it is not evenly and continuously ignited. Accordingly, highly reliable flame monitoring techniques are required for continuously detecting the presence of flame at regions within the boiler adjacent to each of the burners which fire the boiler.

The apparatus to be described in this application is suitable for use with two types of boiler/burner configurations; namely, "wall" (or "opposed") fired boilers, and "corner" (or "vortex") fired boilers. "Wall" or "opposed" fired boilers incorporate a series of burners mounted on two opposing walls of the four vertical walls of the boiler. Sighting tubes (pipes about 5 cm. in diameter) are positioned across the boiler walls (which are typically about 1.5 meters thick) beside and nearly parallel to each burner head. The sighting tubes are pointed approximately toward the expected location of burner flame. Flame detection apparatus is positioned to "sight" through each tube into the boiler region in which flame is expected.

"Corner" or "vortex" fired boilers incorporate vertically separated stacks of burners in each of the four corners of the boiler. The flames produced by the burners merge in a central vortex within the boiler. The burners may be individually tilted in the vertical plane in order to better control the combustion characteristics and location of the fireball within the boiler. Sighting tubes for corner fired boilers must be flexible so that the flame detection apparatus can continuously track the flame as the burners tilt.

Several prior art flame detectors examine the light emitted by the flame and, from the time variation characteristics of these emissions, determine whether a flame is located near to the burner ("near flame"); or, a fireball is present in the background ("far flame"); or, there is no detectable flame. By monitoring flame flicker (i.e. time variations in the light signal emitted in the frequency band(s) under consideration) such prior art detectors attempt to derive a binary signal representative of "flame" and "no flame" conditions. Pre-determined factors such as the geometry of the detector, the wavelength band it is capable of examining, and the frequency band being monitored affect the characteristics of flame flicker and correspondingly determine the ability of such detectors to accurately detect the presence or absence of flame under varying conditions.

The best prior art flame detectors for use on opposed fired boilers appear to be those which utilize two separate linear arrays of detectors aligned horizontally and vertically to facilitate "X-Y" scanning of selected subregions within a region where flame is expected, through electronic selection of an appropriate detector pair. Typically, a zero-crossing waveform shaping analysis is performed on the electronic signals produced by each of the two selected detectors, to generate two bi-level output signals. The output signals are then correlated with one another (prior art detectors of this sort do not however perform true signal correlation, because they work only with binary (i.e. two level) approximations of the detector output signals, rather than with the direct analog outputs of the detectors). If the two signals are highly similar to one another then the correlation result approaches unity. Normally, a result which exceeds some predetermined threshold is accepted as indicating the presence of flame. If the two signals are highly dis-similar to one another then the correlation result approaches zero. A result which does not exceed the aforementioned threshold is normally taken to indicate a "no flame" condition. In some cases, automatic tracking techniques are employed to locate points of maximum correlation in an effort to minimize generation of false "no flame" alarms. It will thus be understood that the prior art is susceptible to error, in that the cumulative approximations inherent in the operation of prior art detectors may result in a "no flame" alarm when flame is in fact present; or, may indicate that flame is present when no flame is in fact present. The prior art tends to overcompensate for these contingencies by allocating flame determination thresholds which minimize generation of false "flame present" signals. However, this necessarily decreases the ability of such prior art devices to respond to flame conditions having light emission characteristics which encompass a large dynamic range.

The inventors believe that superior results may be obtained by concentrating on factors other than flame flicker. More particularly, the inventors believe that superior results may be obtained by analyzing the time→frequency spectral characteristics of light emitted in different visual and infra-red wavebands from the region in which flame is expected, and comparing those characteristics with prestored spectral signatures representative of flame. The present invention accordingly compares short term estimates of the visible and infra-red auto-spectra, the infra-red to visible transfer function, and the infra-red to visible coherence (all of which are hereinafter defined and explained in greater detail), with prestored signatures characteristic of "flame" and "no flame" conditions. The auto-spectra, transfer function and coherence function are used to characterize the relationship between two signals in selected frequency bands. It is this relationship or pattern which is used to identify the flame.

SUMMARY OF THE INVENTION

In accordance with the preferred embodiment, the invention provides flame detection apparatus in which a dual colour sensor senses radiation emissions in the visible frequency band from a first zone or "window", senses radiation emissions in the infra-red frequency band from a second zone or "window", and produces first and second output signals representative of the sensed emissions. A flame viewing lens is optically coupled to the sensor. Means are provided for adjusting the optical coupling such that the two windows coincide within a selected region and diverge outside the region.

Preferably, a plurality of sensors are employed, each sensor being optically coupled to the lens at a selected lateral displacement off the lens' principal axis. Advantageously, fibre optic coupling means may be used to optically couple the lens to the sensors. Cooling means are provided for cooling the lens and the sensors. The cooling means may comprise an air passage for conveying cooling air through the barrels, over the sensors and the lens.

The means for adjusting the optical coupling between the sensor and the lens may comprise a first barrel for mounting the sensors and a second barrel for mounting the lens. The barrels are telescopically interconnected such that the longitudinal displacement between the sensors and the lens may be varied by slidable displacement of the barrels relative to one another.

Flexible mounting means may be provided for mounting the sensors and the lens to permit flexible displacement of the sensors relative to the lens.

The sensors are preferably silicon lead sulphide, silicon lead selenide, or silicon germanium sensors. The lens is preferably sapphire. The fibre optical coupling means is preferably zirconium fluoride.

Signal processing means are provided for receiving the sensor output signals and for selecting a pair of signals produced by a selected one of the sensors. The signal processing means preferably includes a multiplexer for receiving the first and second output signals from each of the sensors, and a tone decoder electrically coupled to the multiplexer, the tone decoder for detecting preselected tone signals. Each tone signal corresponds to one of the sensors. The tone decoder applies one of a corresponding number of select signals to the multiplexer upon detection of any of the tone signals. This causes the multiplexer to pass the first and second output signals produced by the sensor which corresponds to the detected tone signal.

The signal processing means preferably also includes a voltage controlled gain stage for preventing signal saturation when the first and second output signals are produced by bright flame or high flicker flame in the selected region. Advantageously, the signal processing means further includes filter means for filtering the first and second input signals, the filter means having a frequency proportional gain characteristic.

BRIEF DESCRIPTION OF THE DRAWINGS

FIG. 10(*a*) depicting the situation in which the sensor lies on the focal plane; and, FIG. 10(*b*) depicting the situation in which the sensor lies behind the focal plane.

DETAILED DESCRIPTION OF THE PREFERRED EMBODIMENT

Principle of Operation

Figure 1:
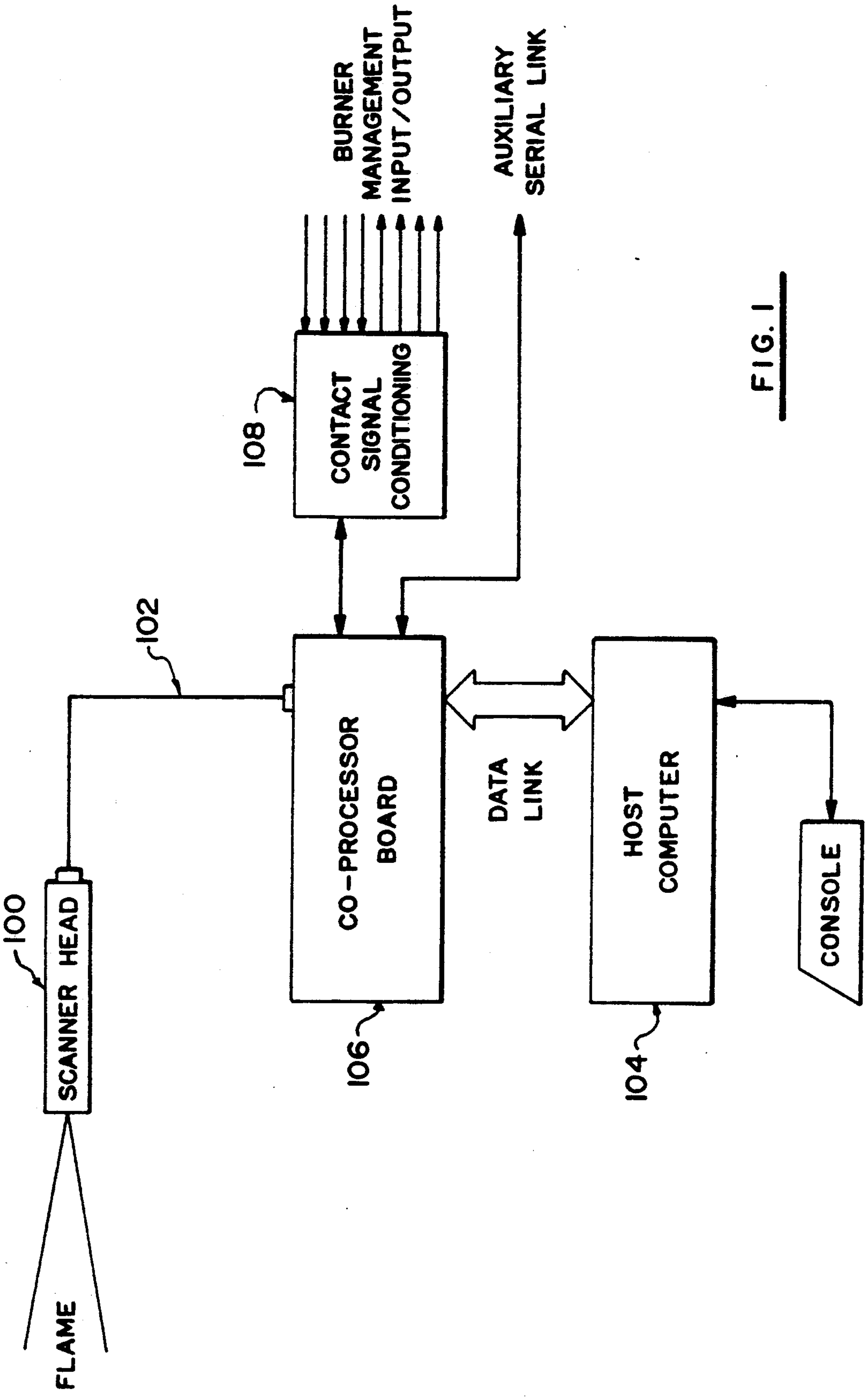
FIG. 1 is a block diagram which illustrates the basic components of a flame detection system constructed in accordance with the preferred embodiment of the invention.

The primary combustion zone of a boiler flame can reach temperatures of 1800° K. At this temperature the blackbody or greybody radiation emitted by the flames peaks in the near infra-red range of the spectrum. As the temperature increases, the peak energy wavelength shifts towards the visible or shorter wavelength region of the spectrum. Similarly, as the temperature decreases, the peak energy shifts towards the infra-red portion or longer wavelength region of the spectrum. "Dual-colour" sensors of the type marketed by Hamamatsu Photonics k.k. of 1126 Ichino-Cho, Hamamatsu City 435, Japan under the part numbers K1713-01 (U.V. enhanced Si/PbS), K1713-02 (U.V. enhanced Si/PbSe) and 1713-03 (U.V. enhanced Si/Ge) can simultaneously monitor both the visible and infra-red spectra emitted by individual burner flames. Suitable dual colour sensors may also be obtained from Infrared Industries Inc., of Orlando, Fla. Although a dual-colour sensor is employed in the preferred embodiment, the invention is not limited to two colour detection (i.e. sensors capable of sensing radiation in a multiplicity of wavebands may be employed).

Combustion is a non-stationary process which can be characterized by the flicker or A.C. content observed in the infra-red and visible emissions of the primary flame-front. In the preferred embodiment, this A.C. flicker content is separately monitored by the visible and infra-red sensors of a dual colour sensor over a frequency range of about 5 Hz to about 500 Hz. The resultant time dependant output signals tend to be correlated with each other. It has been found that there is a high coherency between the visible and infra-red sensor outputs in selected frequency bands when flame is present at a burner, but that the coherency is reduced when flame is not present. This has been found to be true even in the presence of background signals from other burners; and, to a lesser extent, in the presence of coal shrouding, which tends to pass the infra-red but not the visible spectra. This variation in coherency can be partially explained by the fact that the infra-red and visible elements of a dual colour sensor each perceive slightly different angular windows. The divergence (i.e. difference in cross-sectional area of each window) between the infra-red sensor viewing window and the visible sensor viewing window increases with increasing distance from the scanner. This results in lower coherency between the two sensor output signals when the flame location is far from the burner being monitored (i.e. background flame or fireball). When the flame is located directly in front of the burner (i.e. near the sensor) the windows are nearly coincident and the emission spectra, as seen by the dual-colour sensor, tends to be highly coherent (i.e. correlated). In addition, far flames have lower frequency characteristics than near flames, due to the integration effect over a larger cross-sectional window. Thus, the coherency also varies differently in different frequency bands.

Coherency between two time varying signals X(t) and Y(t) is defined as:

$$C_{xy}(\omega) = \frac{|\Phi_{xy}(j\omega)|}{\Phi_{xx}(j\omega)\,\Phi_{yy}(j\omega)}$$

where:

$C_{xy}$=squared coherency
$\Phi_{xy}$=cross-spectrum between X(t) and Y(t)
$\Phi_{xx}$=auto-spectrum of X(t)
$\Phi_{yy}$=auto-spectrum of Y(t)
$\omega$=frequency (radians per second)
j=complex root of (−1).

The coherency function varies with frequency and is limited by:

$$0 < C_{xy}(\omega) < 1.0$$

When the two signals X(t), Y(t) are linearly related the coherency tends toward unity, otherwise the coherency tends to zero.

In accordance with the preferred embodiment of the invention, short term estimates of the coherency between the visible and infra-red emissions from the flame, as detected by the dual colour sensor, are compared with prestored characteristic coherency signatures for the particular burner over a time domain frequency range of 5-500 Hz. The deviation of the short term coherency estimate from the prestored "ideal" signature value is integrated over the frequency range of interest using a weighted difference cost function. This integrated "cost" estimate is then compared with a threshold alarm value, to determine the presence or absence of flame. The signature comparison approach, described above for the coherency function, is also used to compare the difference in short term estimates of the visible and infra-red auto-spectra and infra-red→visible transfer function gain with corresponding "ideal" prestored "flame" and "no flame" signature spectra. These short term spectral estimates may be compared with several prestored characteristic signatures to determine the most likely flame condition. The results of the comparison tests on coherency, visible auto-spectrum, infra-red auto-spectrum, and infra-red→visible transfer function may be individually weighted, by frequency and by function, and summed to form an overall measure of flame condition.

Mechanical and Optical Design Criteria

Flame detectors constructed in accordance with the invention preferably satisfy the following design criteria:

(1) The flame detector is compact, rugged and easily retrofitted to existing boiler sighting tubes. The maximum front lens diameter (typically $<$50 mm) is limited by the size of sensor head that can be installed in the boiler sighting tube. Practical constraints of cost and standard manufacturing sizes limit the front lens diameter to $<$25 mm in most cases.

(2) The flame detector is able to withstand moderately high temperatures ($<300°$ C.).

(3) The flame detector is able to operate in an abrasive and dirty environment without scouring or slagging of the lens assembly occurring. This is achieved by using an air supply to both cool and clean the optical components. If this approach is taken, then provision must be made to supply air to cool the apparatus and to purge and clean the optics.

(4) Lenses are easily replaceable in order to best match the optics to a specific burner design.

(5) The optics should ideally pass wavelengths in the range of $0.2\ \mu m < \lambda < 5.0\ \mu m$ using zirconium fluoride fiber optics, although alternative embodiments of the invention may use quartz optics (which limit the upper passband to $\approx 2.5\ \mu m$).

(6) The optics permit monitoring of adjustable selected viewing windows in front of the burner. These windows are adjustable in both the longitudinal and lateral directions.

(7) The flame detector may be operated with a variety of different sensors.

(8) The signal conditioning electronics in the sensor head maximizes the signal to noise ratio from the sensor in the 5 Hz. to 500 Hz. frequency band and includes high frequency roll-off filters to eliminate signal aliasing.

As illustrated in FIG. 1, the preferred embodiment provides for one or more "scanner heads" consisting of a sighting tube which may be positioned within one of the burner viewing ports located across the boiler wall. The tube contains the viewing optics, dual colour sensor(s) and supporting electronics (each hereinafter described in greater detail). A communications link couples the scanner head electronics to a computer. In the preferred embodiment, the computer is an IBM® personal computer with a co-processor board adapted to monitor the flame signals and independently capable of detecting and signalling flame condition. Optionally, output signals may be provided to support the operation of a separate burner management system using the relay contact outputs provided by the co-processor board to control fuel and air flow to the burners.

Configuration Options

Figure 2:
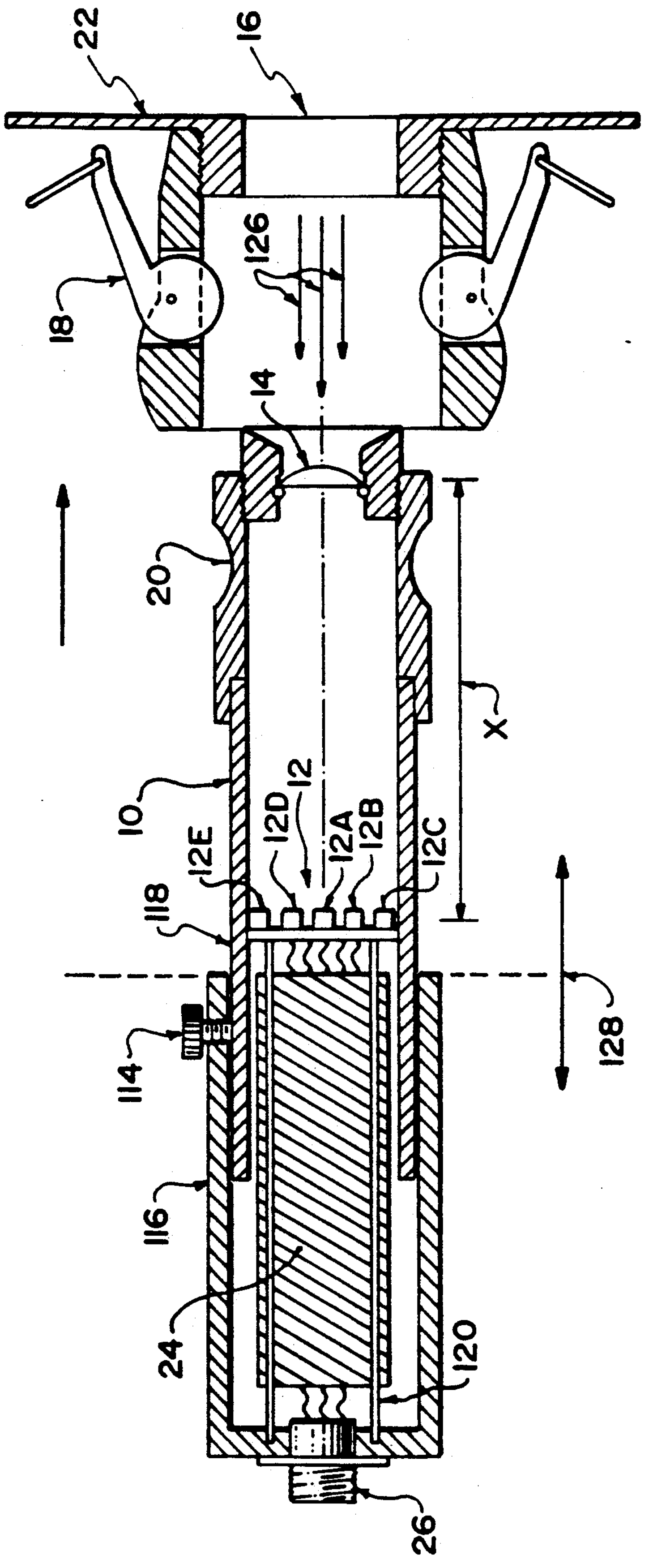
FIG. 2 is a longitudinal cross-sectional illustration of a direct sighting scanner head assembly constructed in accordance with the preferred embodiment.

The preferred embodiment provides three different options for configuring the scanner head. These are:

(1) Direct Sighting Head. FIG. 2 shows the basic elements of a direct sighting flame scanner head 10, in which the lateral and longitudinal displacement between an array 12 of dual colour sensors 12*a* through 12*e* and the lens 14 can be varied to select the viewing window, as shown by the arrows "X" and "Y". The direct sighting head is used where sighting through a simple viewing port 16 is possible. When used with a sighting tube (not shown) the effective viewing angle (window) may be limited by the sighting tube. A cam-lock mechanism 18 is provided to lockably engage notches 20 on scanner head 10, to hold the head in position relative to mounting plate 22. The scanner head electronics are diagrammatically represented at 24. Coupler 26 is provided for receiving a cable for conveying electrical signals to and from electronics 24.

Figure 3:
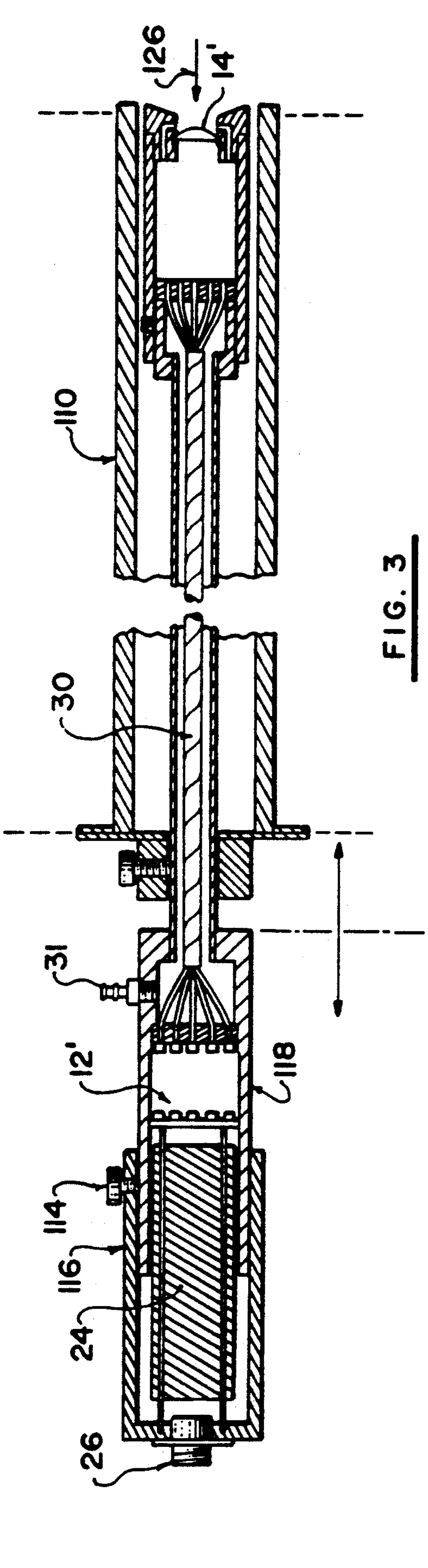
FIG. 3 is a longitudinal cross-sectional illustration of an extended direct sighting scanner head assembly constructed in accordance with the preferred embodiment.

(2) Extended Sighting Head. As depicted in FIG. 3, the extended direct sighting head is similar to the direct sighting head of FIG. 2, the basic difference being the provision of fiber optic cable 30 between dual colour sensor 12′ and lens 14′. Flame position may fluctuate and move out of range of the sighting angles as limited by the sighting tube. To remove this restriction, the extended direct sighting head of FIG. 3 collects light over wider angles at the front of the sighting tube. The device is air cooled by passing cooling air through port 31.

Figure 4:
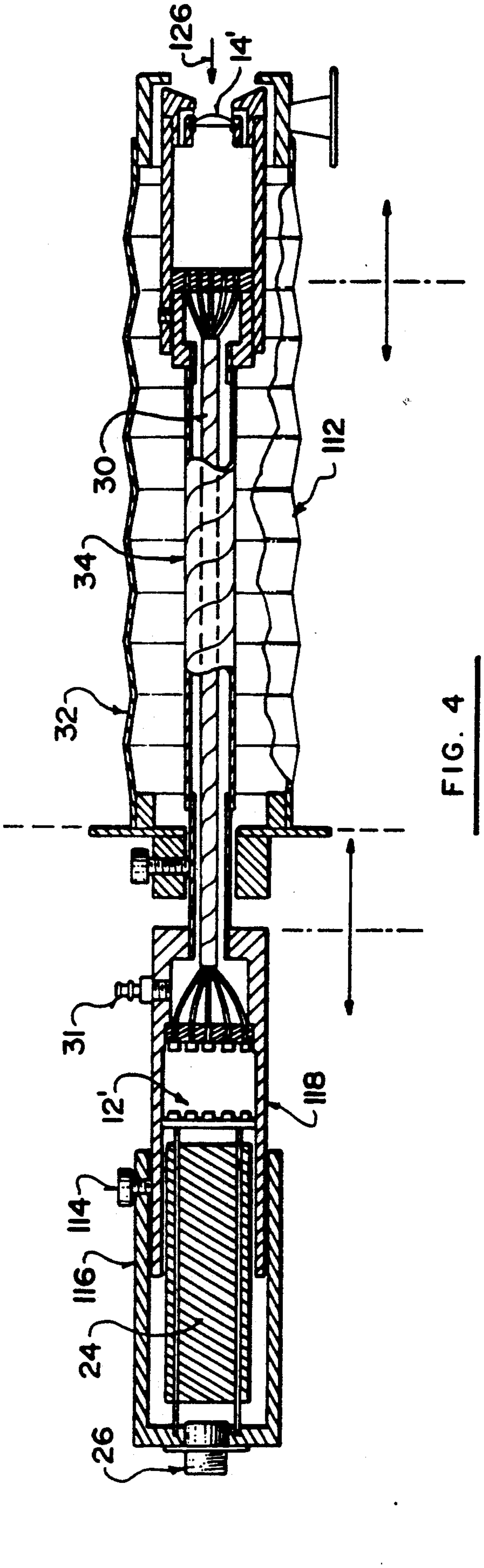
FIG. 4 is a longitudinal cross-sectional illustration of a fiber optic flexible scanner head assembly constructed in accordance with the preferred embodiment.

(3) Flexible Fiber Optic Scanner Head (FIG. 4). The flame scanner must be able to track flame in corner fired boilers at all burner tilt angles. Due to the wide range of possible flame locations, a flexible fiber optic head assembly is required to track the flame. Both the outer guide tube 32 and the inner scanner head 34 are constructed so that they are able to flex. In all other respects the flexible fiber optic scanner head is identical to the extended sighting head.

The three scanner head designs vary significantly in the way in which the flame emissions (visible and infra-red) are directed to the sensors. This is hereinafter explained in greater detail.

Wideband Optics

Sapphire lenses and windows are preferably used throughout. However, alternative materials, such as silicon quartz, may be used with some degradation in performance. Thus, although reference is made to the properties of sapphire lenses and windows, similar properties exist for a range of optical glasses. Similarly, zirconium fluoride fiber optics are preferred, although these too can be replaced by quartz glass equivalents with some degradation in performance.

A sapphire window in front of the sensors protects the sensor material, while passing all wavelengths of interest. The use of a sapphire lens ensures good transmittance characteristics over the full optical range. The advantages of sapphire are: it is chemically inert and therefore not easily corroded; it is very hard and not marred by most abrasive materials; it is very strong, allowing the use of thin lenses; it withstands high temperatures; and, it has a high thermal conductivity, which aids artificial cooling.

Although sapphire does exhibit a birefringence due to its crystalline properties, this has negligible impact on the optical performance of the scanner.

Adjustable Optical Path (Viewing Windows)

The optical path from the flame to the sensor is adjustable. Five basic adjustments are possible. These are:

(1) The choice of lens focal length. The scanner head barrel length dictates that the lens focal length should be significantly less than the maximum distance that the sensor can be positioned behind the lens. Conventionally available plano-convex sapphire lenses have design focal lengths of 100 mm, 50 mm or 25 mm. Other custom design focal lengths are available.

(2) The use of an aperture plate which limits the apparent lens diameter. This feature is not ordinarily employed but can effectively determine the viewing window in conjunction with item (3) below.

(3) The distance from the sensor to the lens along the viewing axis determines the viewing window in conjunction with item (2) above.

(4) The lateral position of the sensor, off the principal axis, determines the viewing window offset angle.

(5) Sensor dimensions (i.e. cross-sectional area and shape).

In each of the three scanner head design configuration options hereinbefore mentioned, the first four parameters are independently adjustable to meet particular viewing window requirements. The fifth parameter, namely the relative dimensions of the preferred silicon and lead selenide/sulphide dual colour sensor, also determines the size of the visible and infra-red viewing windows, but is a parameter which can only be controlled at the time of ordering the sensor from the manufacturer.

Multiple Sensor/Array Scanning Capability

In addition to sensor 12*a* (FIG. 2) which lies on the principal longitudinal axis of the scanner head, up to four more sensors 12*b*, 12*c*, 12*d* and 12*e* can be placed at progressively greater lateral distances off the principal axis to provide a linear optical array which can be selectively scanned. Sensor array 12 is able to discriminate and dynamically track the movement of the burner flame over a wider viewing angle than would be possible with a single sensor, while maintaining a narrow viewing acceptance angle for individual sensors (and hence retaining good A.C. flicker signal characteristics).

Multiple Sensor Types

The flame detection apparatus can be configured with three types (Si/PbS, Si/PbSe or Si/Ge) of dual-colour sensors which use four basic sensor materials. These are:

(1) Silicon (Si) (photovoltaic) sensor operating in the visible wavelength range from 0.2 $\mu$m to 1.15 $\mu$m; cell size $\approx$2.5 mm$\times$2.4 mm (custom dimensions are available from the sensor manufacturer for selecting particular viewing window characteristics).

(2) Lead Sulphide (PbS) (photoresistive) sensor operating in the infra-red wavelength range from 1.1 $\mu$m to 2.5 $\mu$m; sensor size $\approx$2.0 mm$\times$2.0 mm (again, custom sensor sizes are available from the sensor manufacturer).

(3) Lead Selenide (PbSe) (photoresistive) sensor operating in the infra-red wavelength range from 1.1 $\mu$m to 4.85 $\mu$m; sensor size $\approx$2.0 mm$\times$2.0 mm.

(4) Germanium (Ge) (photovoltaic) sensor operating in the infra-red wavelength range from 1.1 $\mu$m to 1.9 $\mu$m; sensor size $\approx$2.0 mm diameter.

These sensors are housed in an industry standard TO5 package and are available from several sensor manufactures, including the two previously mentioned. Custom sized sensors are also available.

Dual Colour Detector

The sensors are constructed as two-colour detectors. A silicon (Si) photovoltaic sensor detects incident radiation in the visible range. This is superimposed in front of the appropriate infra-red sensor substrate. Since these sensors are thin films, they are effectively coplanar. The sensor elements are constructed to be symmetrical about a central axis, but are of different dimensions. The active sensor area of each material can be varied to achieve the desired viewing window characteristics. This, however, is a one time choice, made at the time the sensor is ordered from the manufacturer.

Multi Colour Detector

Although the preferred embodiment herein described employs dual-colour (i.e. visible and infra-red) sensors as described above, three colour sensors having silicon (Si), germanium (Ge), and one of lead sulphide (PbS) or lead selenide (PbSe) detectors are available. The principle of detection remains the same, except that the auto-spectra, coherency and transfer function can now be estimated for three pairs of signals, as given by: Si→Ge; Si→PbSe; and, Ge→PbSe. The principle of flame detection is unaltered, but the variation and sensitivity to small changes in flame state are enhanced.

Direct Sighting Optics

Optical Layout

Figure 5:
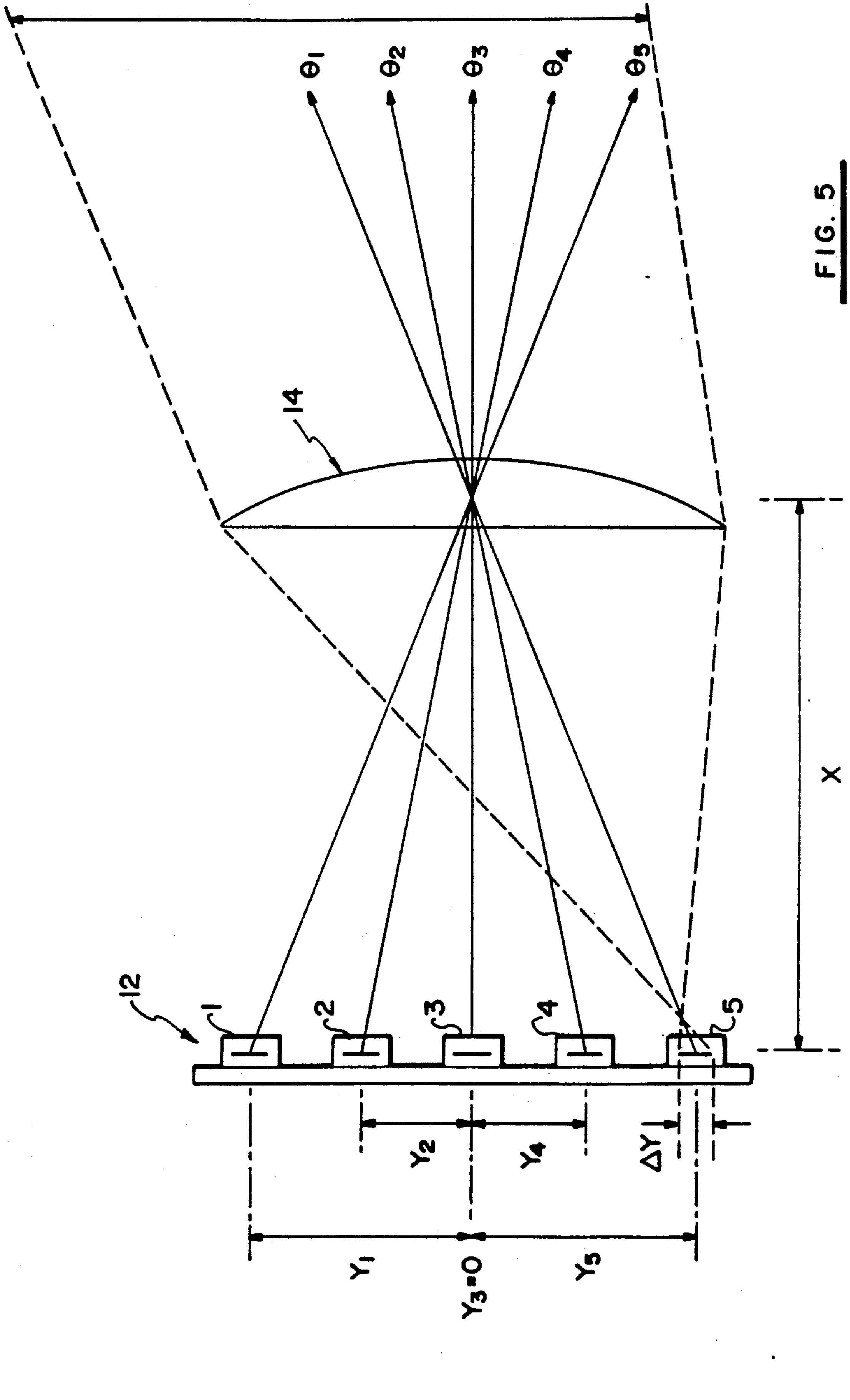
FIG. 5 illustrates diagrammatically how discrete viewing windows are established by the preferred embodiment of the invention.

FIG. 5 shows the array scanning concept, whereby a dual colour sensor array 12 comprised of five dual colour sensors numbered 1 through 5 in FIG. 5 (one of which, namely sensor 3, lies on the principal axis and the others are vertically displaced above and below the principal axis, as shown) may be electronically scanned to select one of the five sensors which "sees" through lens 14 into a particular viewing window within the boiler. For example, the dashed lines in FIG. 5 illustrate the viewing window of the lowermost sensor 5, as determined by the height of the sensor, its vertical displacement off the principal axis, the distance "X" from sensor 12 to lens 14, and the lens focal length. The viewing window of sensor 5 has a mean viewing angle $\theta_5$ given by $\tan^{-1}(Y/X)$, where "Y" is the vertical displacement of the sensor relative to the principal axis. The mean viewing angles of the windows "seen" by the other four sensors are indicated in FIG. 5 as $\theta_1$, $\theta_2$, $\theta_3$, and $\theta_4$ respectively.

Figure 6:
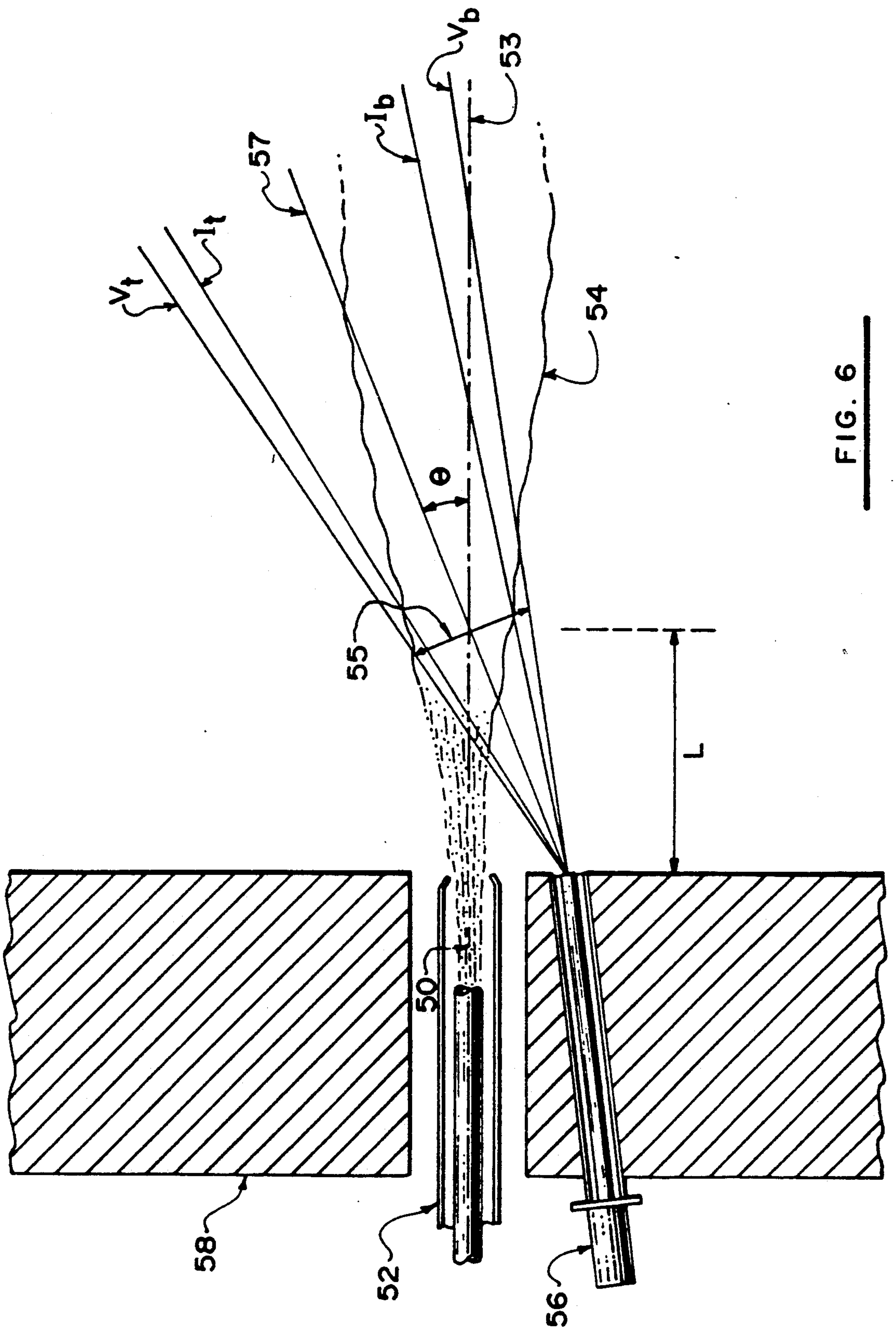
FIG. 6 is a cross-sectional illustration depicting the placement of an extended direct sighting scanner head assembly within a boiler wall and the range of viewing windows thereby obtained within a region of expected flame.

As previously explained, each dual colour sensor incorporates separate visible and infra-red sensors. These each "see" slightly different windows within the boiler, as illustrated in FIG. 6. Fuel 50 fed through burner 52 ignites to produce flame 54. Direct sighting scanner head 56 is mounted in boiler wall 58 at an angle relative to burner 52, so that the sensors within scanner 56 can "see" the region in front of burner 52 in which flame 54 is expected. The visible sensor component of the dual colour sensor within scanner 56 "sees" a "visible window" having top and bottom visibility limits as indicated in FIG. 6. The infra-red sensor component "sees" a somewhat narrower "infra-red window" having top and bottom visibility limits which are also indicated in FIG. 6.

The optics will now be discussed in greater detail with reference to FIGS. 5 through 10. Key symbols are labelled on the drawings and are defined in the list of symbols hereinafter provided.

In the direct sighting head design (FIG. 10A) the dual colour sensor 12 is placed perpendicular to the principal axis "$P_A$" and located a distance "X" behind the secondary principal point of lens 14. The midpoint of the sensor may also be offset a perpendicular distance "$Y_m$" from the principal axis. Both the visible and infra-red sensors have finite dimensions $\pm Y_{vis}$ and $\pm Y_{IR}$ respectively as measured from the midpoint of each sensor.

Figure 7:
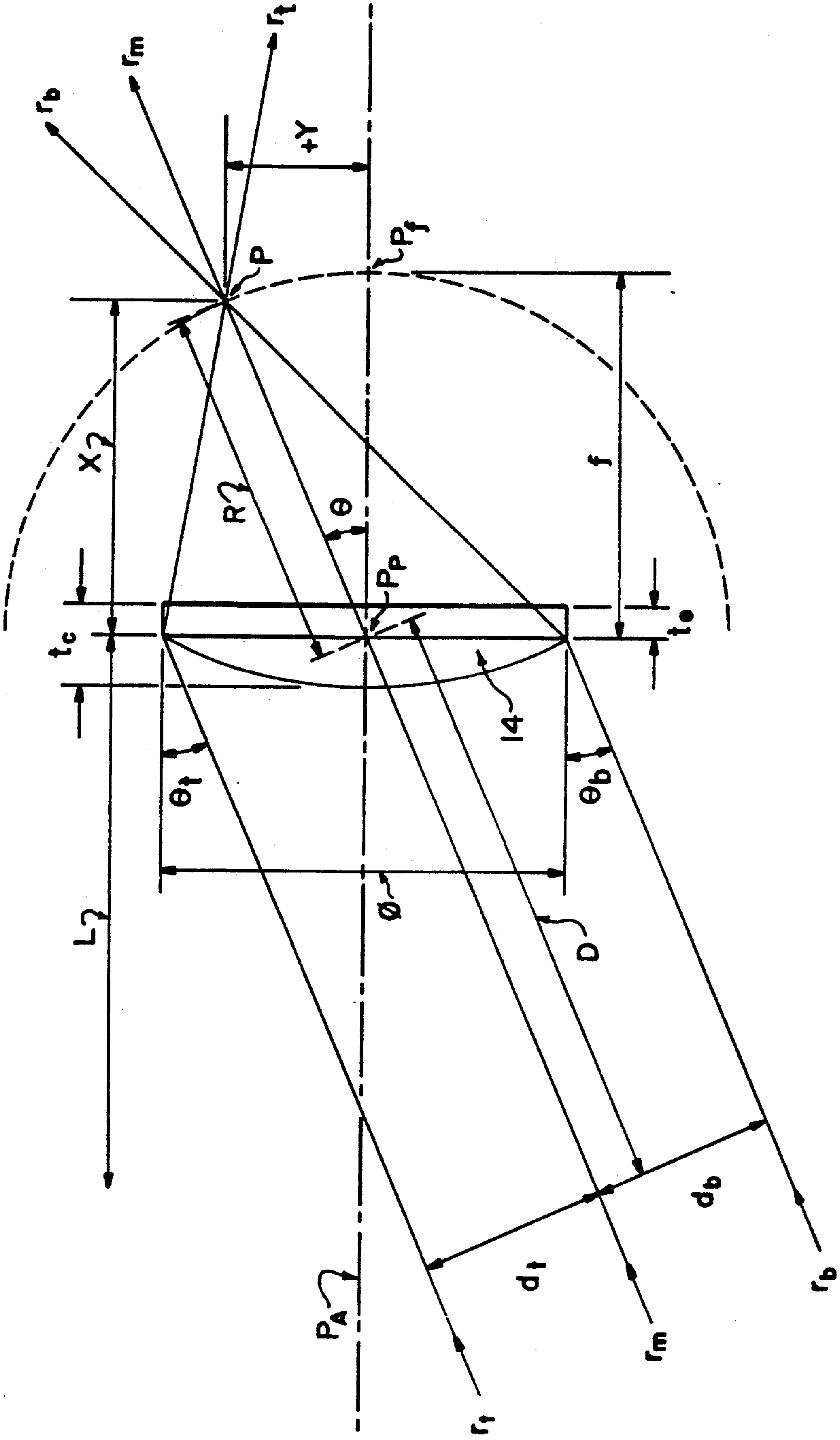
FIG. 7 is a schematic illustration depicting the viewing window trigonometry applicable to the case in which the photocell or fiber optic termination point "P" lies on the focal plane.
Figure 8:
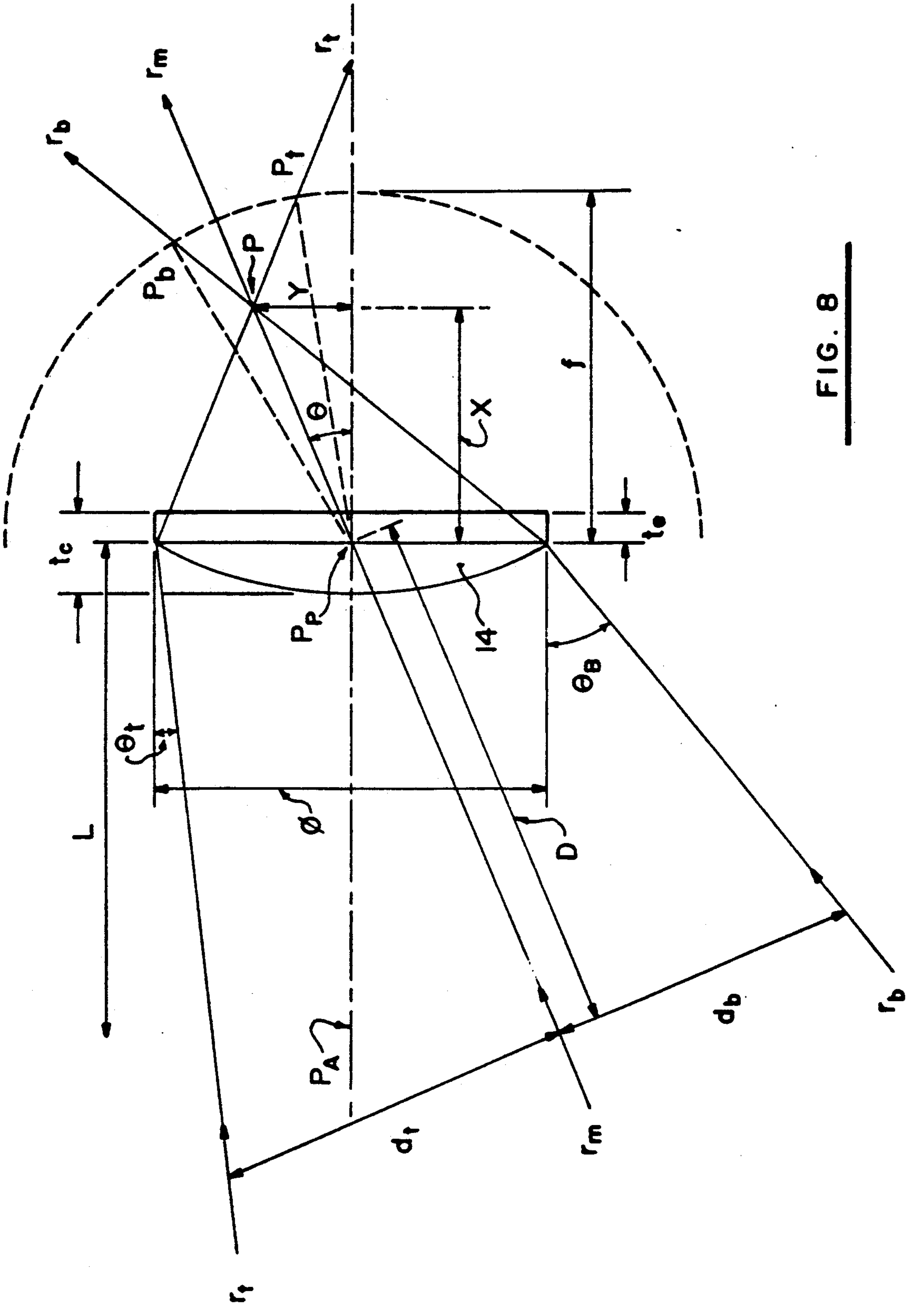
FIG. 8 is a schematic illustration depicting the trigonometry applicable to the situation in which the point "P" lies in front of the focal plane.
Figure 9:
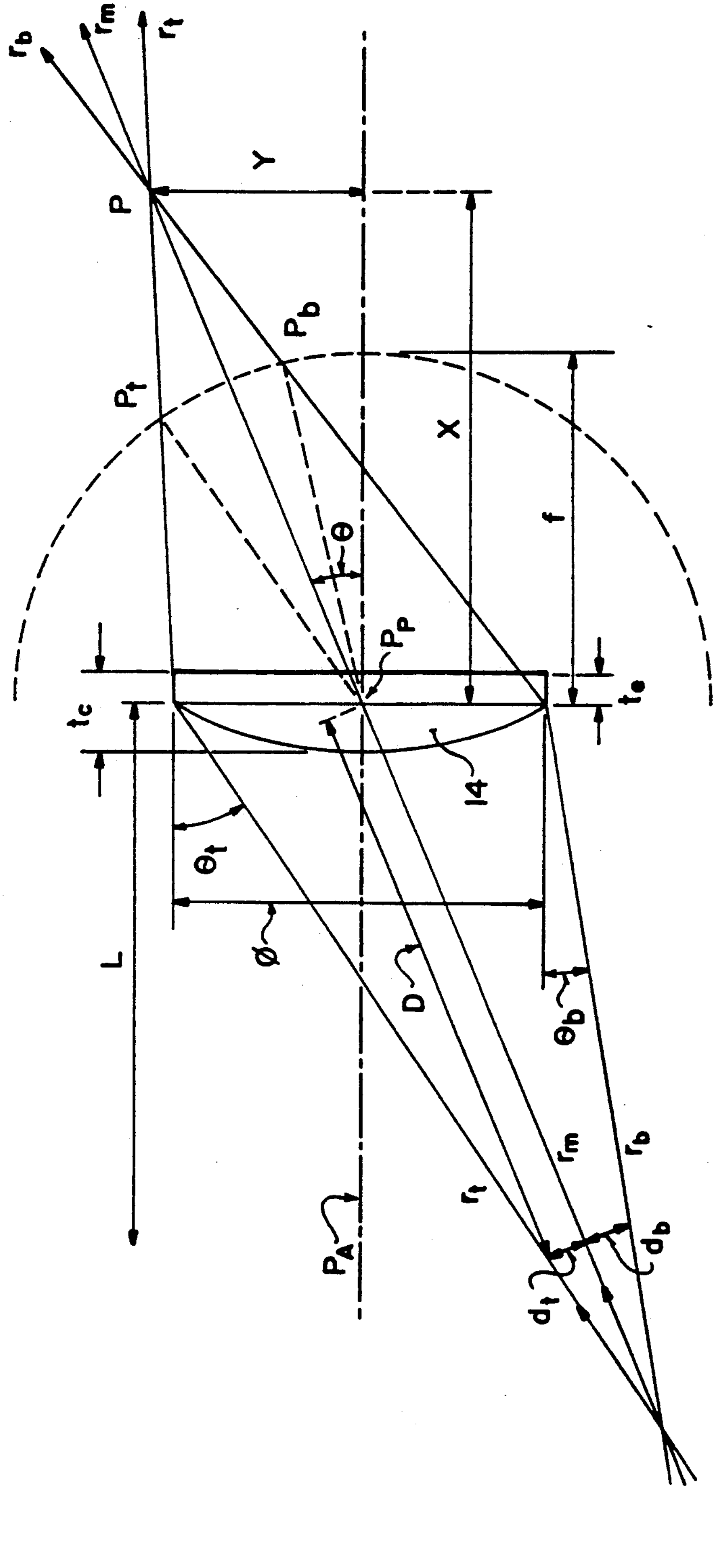
FIG. 9 is a schematic illustration depicting the trigonometry applicable to the situation in which the point "P" lies behind the focal plane.
Figure 10A:
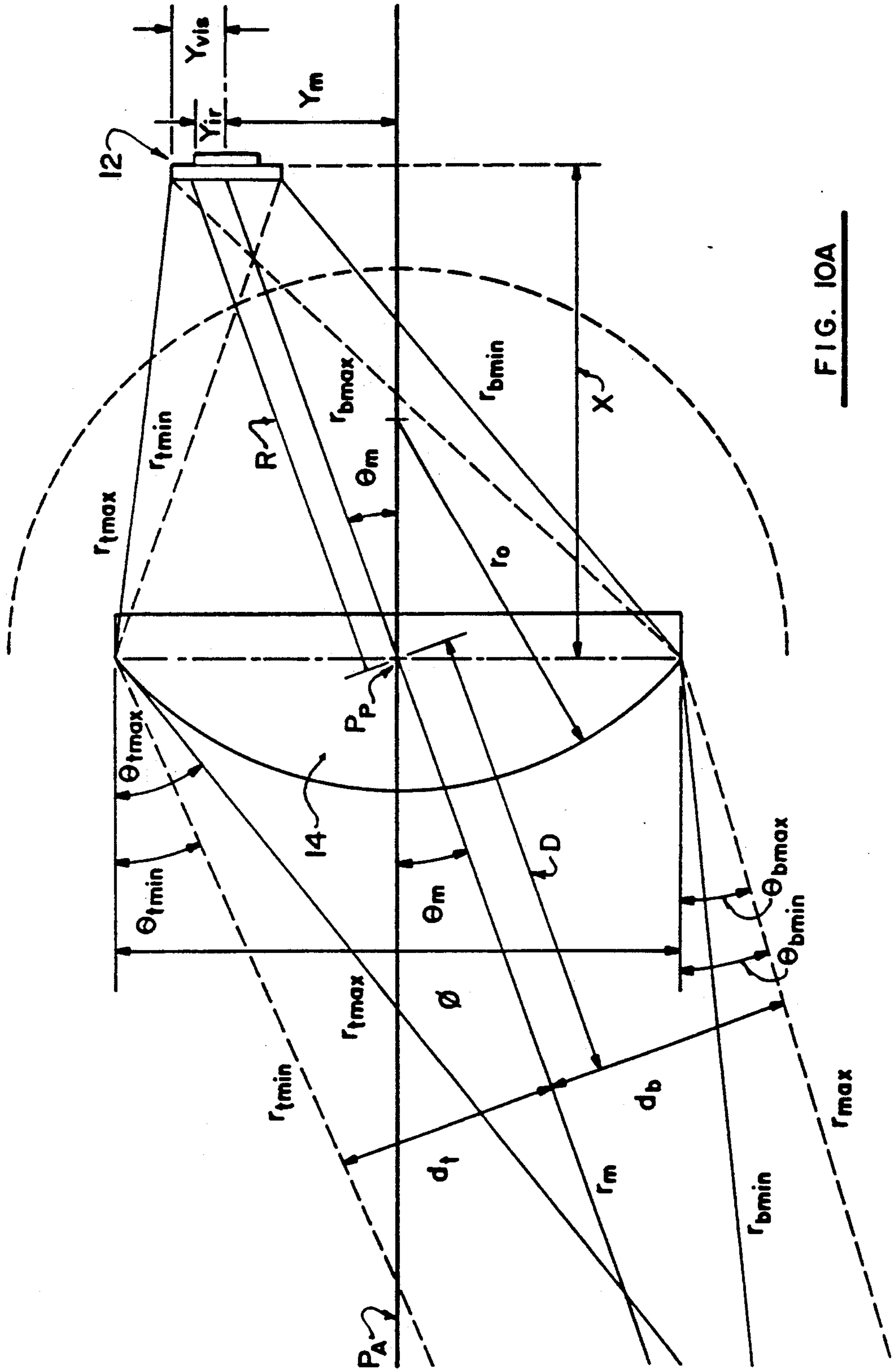
FIG. 10 is a schematic illustration depicting the determination of windows for non-point source sensors.
Figure 10B:
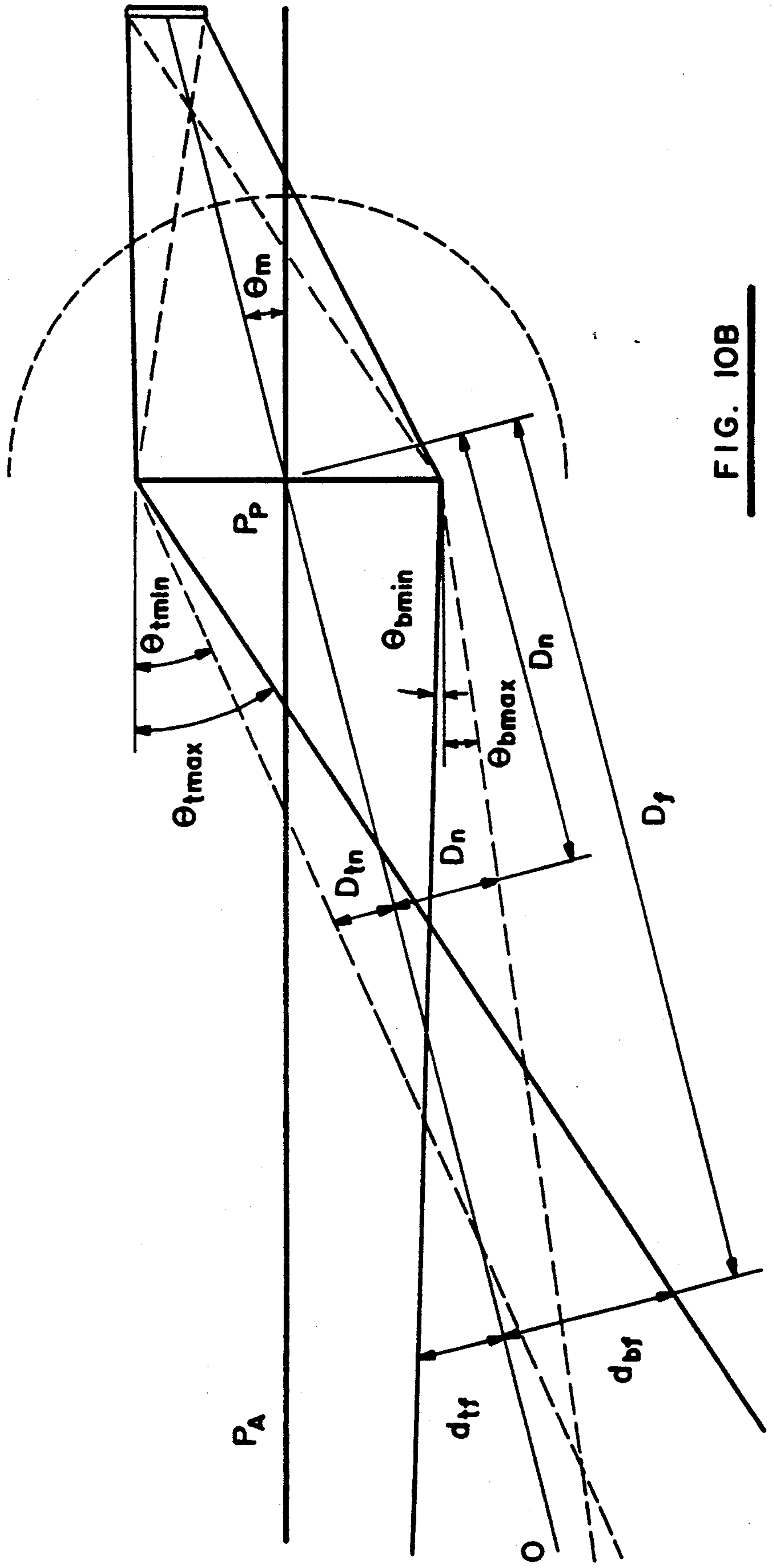

The offset "$Y_m$" determines the sensor midpoint viewing angle "$\theta_m$". As shown in FIG. 10A, the surface area of each sensor absorbs incident energy that has been diffracted by lens 14. Since the dimensions of both sensor 12 and lens 14 are finite, energy sources located in front of lens 14 can be observed by sensor 12 over a range of angles. These angles are determined by the location of sensor 12 relative to lens 14 and by the lens and sensor dimensions. Projecting light rays forward from sensor 12 defines the dimensions of a viewed window at any given distance "L" in front of lens 14. Referring to FIGS. 7, 8 and 9, the following three window configurations are possible:

(1) The sensor is located on the focal plane (i.e. at point "P" shown in FIG. 7). The viewed window diverges with respect to lens 14 due to the finite sensor dimensions. The sensor will only be on the focal plane for a particular wavelength, $\lambda_o$, of incident light. The lens focal length decreases for shorter wavelengths ($<\lambda_o$) and increases for longer wavelengths. As the sensor responds over a band of wavelengths the window angle is implicitly also a function of wavelength (see "Window Design" below).

(2) If the sensor is located in front of the focal plane (i.e. at point "P" shown in FIG. 8) it observes all emitted energy between the widely diverging angles $\theta_{tmin}$ and $\theta_{bmax}$ (see FIG. 10A).

(3) If the sensor is located behind the focal plane (i.e. at point "P" shown in FIG. 9) two possible windows exist:

(i) Near the lens the window defined by $\theta_t$ and $\theta_b$ converges.

(ii) At the point beyond where the ray subtended by angle $\theta_b$ crosses that subtended by $\theta_t$ the window diverges. In this case, the finite sensor dimensions depicted in FIG. 10A result in two (near and far) convergent points and hence define a focal range.

Sighting Options for the Sensor

The scanner head design allows a number of parameters to be easily changed. These design options are:

1. The material that the lens is made of. This determines the maximum optical bandwidth that can be detected. The resulting variation in the index of refraction with wavelength affects the viewing window size, as the lens focal length is a function of wavelength.

2. The type of visible or infra-red sensor used to detect the radiant energy. This also determines the optical bandwidth that is detected.

3. The linear dimensions of each sensor. This determines the shape of the observed window. Larger sensor dimensions provide a larger viewing window.

4. The ratio of the linear dimensions and areas of the visible and infra-red coplanar sensors. At any given wavelength the visible and infra-red window sizes are proportional to this ratio.

5. The lens diameter or intermediate aperture plate diameter. This determines the total energy striking the sensor and also affects the dimensions of the viewing window. A larger aperture allows more energy to strike the sensor, resulting in greater sensitivity at low energy thresholds and in a larger viewing window.

6. The lens focal length. The viewing window dimensions are inversely proportional to the focal length. A longer focal length provides a narrower viewing angle.

7. The sensor offset "$Y_m$" location. This parameter determines the angle of the optical axis relative to the principal axis. This allows offset viewing angles relative to the principle mounting axis of the scanner head.

8. The sensor "X" location. The relationship between "X" and the dimensions of the viewing window is non-linear and depends on the sensor's location relative to the focal plane. (This is discussed in greater detail below under the heading "Window Design").

Viewing Window Design And Selection Criteria

Selection Criteria

As indicated by FIG. 6, the flame scanner head 56 is typically located in a burner viewing port tube located near the burner 52 being monitored. The tube is canted slightly towards the burner so that the axis of the tube will intersect the burner flame axis at a location near where flame 54 is expected. Assuming the tube dimensions do not limit the viewing window, the optics can be optimized to observe a specific window area located a distance "L" in front of the sensor head for any particular wavelength. The variation in window area, for the visible and infra-red, should be minimal across the desired optical bandwidth at the design distance "L". This can be approximately attained by careful design and selection of the sighting options listed above. This is an iterative procedure which may be aided by the use of a computer program to calculate the viewing window as a function of all of the relevant optical parameters. The theoretical basis for the required program is developed below under the heading "Window Design".

The signals from both the visible and infra-red sensors are sent to a remote processor. It has been determined that the A.C. amplitude signals from the visible and infra-red sensors measured over a 5-500 Hz. bandwidth contain the most useful information. The auto-spectra, transfer function and coherency of these two signals are estimated over short time intervals to determine the flame condition. The relative dimensions of the visible and infra-red windows may have to be adjusted in order to extract the maximum useful information from the observed flame.

Window Design

The optical theory underlying the invention will now be developed for a sensor assumed to be a point source or sink. This derivation will then be extended to cover the two dimensional case where the sensor is assumed to be of a finite length. Finally, a three dimensional derivation, assuming a sensor having finite length and width, is presented.

Throughout these derivations, ray tracing techniques are used to determine the imaging characteristics of a lens. The rays possess the following properties:

(1) Rays are diffracted, or bent, only by the lens and continue unimpeded in straight lines on either side of the lens.

(2) All rays passing through the principal point ($P_p$) exhibit no diffraction and therefore continue with no change in direction on both sides of the lens. Each individual ray intersects the principal point ($P_p$) at an angle ($\theta$) relative to the principal axis.

(3) Ray paths are completely reversible, yielding the same results whether the rays are traced from in front of the lens to behind the lens or in the reverse direction.

(4) All rays emanating from an arbitrary point on the focal plane and passing through the lens will be diffracted so that they continue in a parallel line in front of the lens.

The design wavelength ($\lambda_o$) of sapphire, at which the manufacturer specifies the optical properties of lenses, is 0.5461 μm. At wavelengths ($\lambda$) other than the design wavelength the refractive index (n) of sapphire and hence the focal length of the lens can be calculated from an empirical equation provided by the manufacturer. This equation is:

$$n^2 - 1 = \frac{A_1\lambda^2}{\lambda^2 - \lambda_1} + \frac{A_2\lambda^2}{\lambda^2 - \lambda_2} + \frac{A_3\lambda^2}{\lambda^2 - \lambda_3} \qquad (1)$$

rearranging equation (1) gives:

$$n = \sqrt{1 + \frac{A_1\lambda^2}{\lambda^2 - \lambda_1} + \frac{A_2\lambda^2}{\lambda^2 - \lambda_2} + \frac{A_3\lambda^2}{\lambda^2 - \lambda_3}} \qquad (2)$$

where $A_1 = 1.023798$ $A_2 = 1.058264$ $A_3 = 5.280792$ $\lambda_1 = 0.00377588$ $\lambda_2 = 0.0122544$ $\lambda_3 = 321.3616$ for thin lenses:

$$\frac{1}{f} = (n-1)\left[\frac{1}{r_1} - \frac{1}{r_2}\right] \qquad (3)$$

for a plano-convex lens $r_2 = \infty$. Hence equation (3) reduces to:

$$\frac{1}{f} = (n-1)\frac{1}{r_1} \qquad (4)$$

Therefore, substituting the nominal design focal length "$f_o$" into equation (2) gives the design index of refraction "$n_o$". Rearranging equation (4) and substituting the nominal design focal length "$r_o$" which is:

$$r_o = f_o(n_o - 1) \qquad (5)$$

The focal length "f" at any arbitrary wavelength λ can now be calculated from:

$$f = \frac{r_o}{(n-1)} = f_o\left[\frac{(n_o - 1)}{(n-1)}\right] \qquad (6)$$

where the index of refraction "n" is calculated from equation (2).

Based on ray tracing techniques and using the appropriate symbols and definitions, FIG. 7 schematically illustrates the paths of the rays passing through the top "$r_t$" middle "$r_m$" and bottom "$r_b$" of the lens and converging to an arbitrary point "P" on the focal plane. The following definitions should be noted.

1. The principal axis "$P_A$" is defined to be centred on, and perpendicular to, the surface of lens 14.

2. The principal surface is an imaginary surface where all rays parallel to the principal axis in front of the lens are singly refracted to come to a focus at the rear focal point "$P_f$".

3. The principal point "$P_p$" is located at the intersection of the principal surface and the principal axis "$P_A$".

4. All dimensions along the principal axis "$P_A$" are measured from the principal point "$P_p$".

5. The focal length "f" is the distance from the principal point to the rear focal point "$P_f$".

6. The lens has a finite centre thickness "tc" and edge thickness "te".

7. The lens has a finite aperture diameter "$\phi$".

8. The lens has a design radius of curvature "$r_o$".

In order to simplify the derivation of the optical equations the following assumptions have been made:

(1) The actual plano-convex lenses being used are quite thin; consequently, it has been assumed that the lens thickness, both "tc" and "te", has been reduced to zero.

(2) This results in the secondary principal surface being a plane centred on and perpendicular to the principal axis "$P_A$" and having a diameter equal to the lens diameter "$\phi$". The lens is reduced to a single diffracting plane.

(3) Since the individual sensors can have large lateral offsets, "$Y_m$", it has also been assumed that the focal plane is in fact a hemisphere centred at the principal point "$P_p$" with a spherical radius equal to the focal length "f".

The flame in front of the lens is not necessarily focused as an image behind the lens. It is only necessary to calculate the angular limits of the viewing window in front of the lens to determine which radiation sources will be viewed by the sensor. Each sensor is activated by the total optical energy incident on its surface in the sensor bandwidth, irrespective of the source of that energy.

It will now be shown that for a point "P" arbitrarily located behind the lens, the window angles measured at the top and bottom of the lens can:

(1) result in a parallel viewing window in front of the lens if point "P" is located on the focal plane (FIG. 7); or, (2) result in a diverging viewing window in front of the lens if point "P" is located in front of the focal plane (FIG. 8); or, (3) result in a converging then diverging viewing window in front of the lens if point "P" is located behind the focal plane (FIG. 9).

The radius "R" from the principal point to an arbitrary point "P" located behind the lens is given by:

$$R = \sqrt{X^2 + Y^2}$$

The corresponding angle "$\theta$" subtended by the principal point to the point "P" relative to the principal axis is given by $\theta = \arctan(Y/X)$.

As defined in FIGS. 7, 8, 9 and 10, the following conventions hold:

(1) Relative to the principal axis, "$P_A$", positive angles are measured upwards behind the lens and downward in front of the lens.

(2) With respect to the principal axis, "$P_A$" positive, "Y" dimensions are upward behind the lens and downward in front of the lens.

(3) Positive "X" dimensions are measured from the principal point "$P_p$" along the principal axis "$P_A$" behind the lens.

(4) Positive "L" dimensions are measured from the principal point "$P_p$" along the principal axis "$P_A$" in front of the lens.

(5) The angular windows in front of the lens are measured from the top and bottom edges of the lens, parallel to the principal axis.

FIG. 7 illustrates the case in which point "P" is arbitrarily located on the focal plane. Based on the principles of ray tracing, the middle ray "$r_m$" traverses both point "P" and the principal point "$P_p$" with no change in direction. This determines the angle "$\theta$" both in front of and behind lens 14. Both the top ray "$r_t$" and the bottom ray "$r_b$" converge at point "P" then continue to diverge behind point "P". In front of lens 14, all rays are parallel to the middle ray and subtend an angle "$\theta$" to the principal axis.

FIG. 8 illustrates the case in which point "P" is located in front of the focal plane. As in FIG. 7, the middle ray "$r_m$" traverses both point "P" and the principal point "$P_p$" with no change in direction. This determines the middle ray viewing angle "$\theta$". The top ray "$r_t$" however intersects the focal plane at point "P " and the bottom ray "$r_b$" intersects the focal plane at point "$P_b$". The angle "$\theta_t$" at which the top ray "$r_t$" enters the top of the lens is determined by the angle of the ray intersecting both point "$P_t$" and the principal point "$P_p$". Similarly, the angle "$\theta_b$" at which the bottom ray "$r_b$" enters the bottom of the lens is determined by the angle of the ray intersecting both point "$P_b$" and the secondary principal point "$P_p$".

If point "P" is on the focal plane as shown in FIG. 7, then:

$$\theta_t = \theta = \theta_b$$

and the viewing windows in front of the lens are parallel to one another and therefore constant at all locations.

If point "P" is in front of the focal plane as shown in FIG. 8, then:

$$\theta_t < \theta < \theta_b$$

and the viewing window in front of the lens diverges.

If point "P" is behind the focal plane, as shown in FIG. 9, then:

$$\theta_t > \theta > \theta_b$$

and the viewing window in front of the lens converges to a focal point, then diverges.

To extend this theory to determine the viewing window for a sensor with finite "Y" dimensions (FIG. 10A) the above calculations are repeated for the following three "Y" locations:

(1) The top of the sensor at "$Y_m + Y_{vis}$" or "$y_m + Y_{IR}$".

(2) The mid point of the sensor at "$Y_m$".

(3) The bottom of the sensor at "$Y_m - Y_{vis}$" or "$Y_m - Y_{IR}$".

For each of these three sensor locations the top, middle and bottom viewing window angles are calculated:

$\theta_t$, $\theta$ and $\theta_b$ respectively. From these calculations the following angular limits are determined:

(1) The maximum top window angle "$\theta_{tmax}$".

(2) The minimum top window angle "$\theta_{tmin}$".

(3) The maximum bottom window angle "$\theta_{bmax}$".

(4) The minimum bottom window angle "$\theta_{bmin}$".

(5) The sensor mid point viewing angle "$\theta_m$" calculated at "$Y_m$".

If $\theta_{tmax} < \theta_{bmin}$, then the viewing window angle diverges continuously from the bottom of the lens at angle $\theta_{bmax}$. Similarly, if $\theta_{tmin} < \theta_{bmin}$, then the viewing window angle diverges continuously from the top of the lens at angle $\theta_{tmin}$. Alternatively, if $\theta_{tmax} > \theta_{bmax}$, then the viewing window angle from the bottom of the lens is determined by $\theta_{bmax}$, until $\theta_{tmax}$ intersects $\theta_{bmax}$, then the window angle is determined by $\theta_{tmax}$. Similarly, if $\theta_{tmin} > \theta_{bmin}$, then the viewing window angle from the top of the lens is determined by $\theta_{tmin}$, until $\theta_{bmin}$ intersects $\theta_{tmin}$, then the viewing window angle is determined by $\theta_{bmin}$.

The linear dimensions of a window (FIG. 10A) located on the optical axis "O" a specific distance "D" in front of the lens at a mid point angle "$\theta_m$" can also be calculated. The top and bottom dimensions measured from the optical axis $d_t$ and $d_B$, must be calculated separately then added together.

In order to extend these calculations to a three dimensional configuration, the two dimensional derivation is repeated for the width of a specific sensor. The resulting angular and linear lengths and widths are then multiplied together to obtain the actual observed solid angle and cross-sectional window areas.

A computer program which implements the foregoing calculations facilitates selection of the best combination of lens, sensor and sensor position for any given application. Since any multiple lens system can be combined to yield an equivalent single lens system, this same technique is readily expandable from the lens direct sighting case to scanners having more sophisticated optics. Computer simulations have shown that the scanner head variables are interdependent. As an example, the viewing window angles vary with the wavelength of the observed radiation. This means that for a given set of input variables the resulting apparent window can vary significantly over the full range of wavelengths being observed. This property is used to select different window properties for the visible and infra-red sensor elements. The windows are chosen so that they approximately coincide at the expected flame location, but diverge at other locations. Thus the sensor outputs tend to be highly coherent when flame is present, but less so otherwise.

Extension of Window Theory for Extended Direct Sighting and Fiber Optics Scanner Heads The viewing window theory developed for the direct sighting head is applicable to the extended and flexible fiber optic scanner head designs. In these cases the incoming flame radiation is focused onto a fiber bundle termination plate. The fiber optic bundle dimensions are substituted for the sensor dimensions in FIG. 10A and the theory of operation is replicated exactly as long as the following conditions hold:

(1) The angle subtended by the incident radiation to the principal axis of the fiber bundle is less than the acceptance angle of the bundle (typically $< \pm 25°$).

(2) All the energy transmitted by the bundle is focused on the active sensor area at the remote end of the fiber.

Given these two constraints, which are easily met in practice, the fiber optic viewing window is identical to the direct sighting window. Positioning the fiber optic termination point with respect to the plano-convex lens facilitates adjustment of the viewing offset angle and window.

Scanner Head Electronics

Overview

Figure 11:
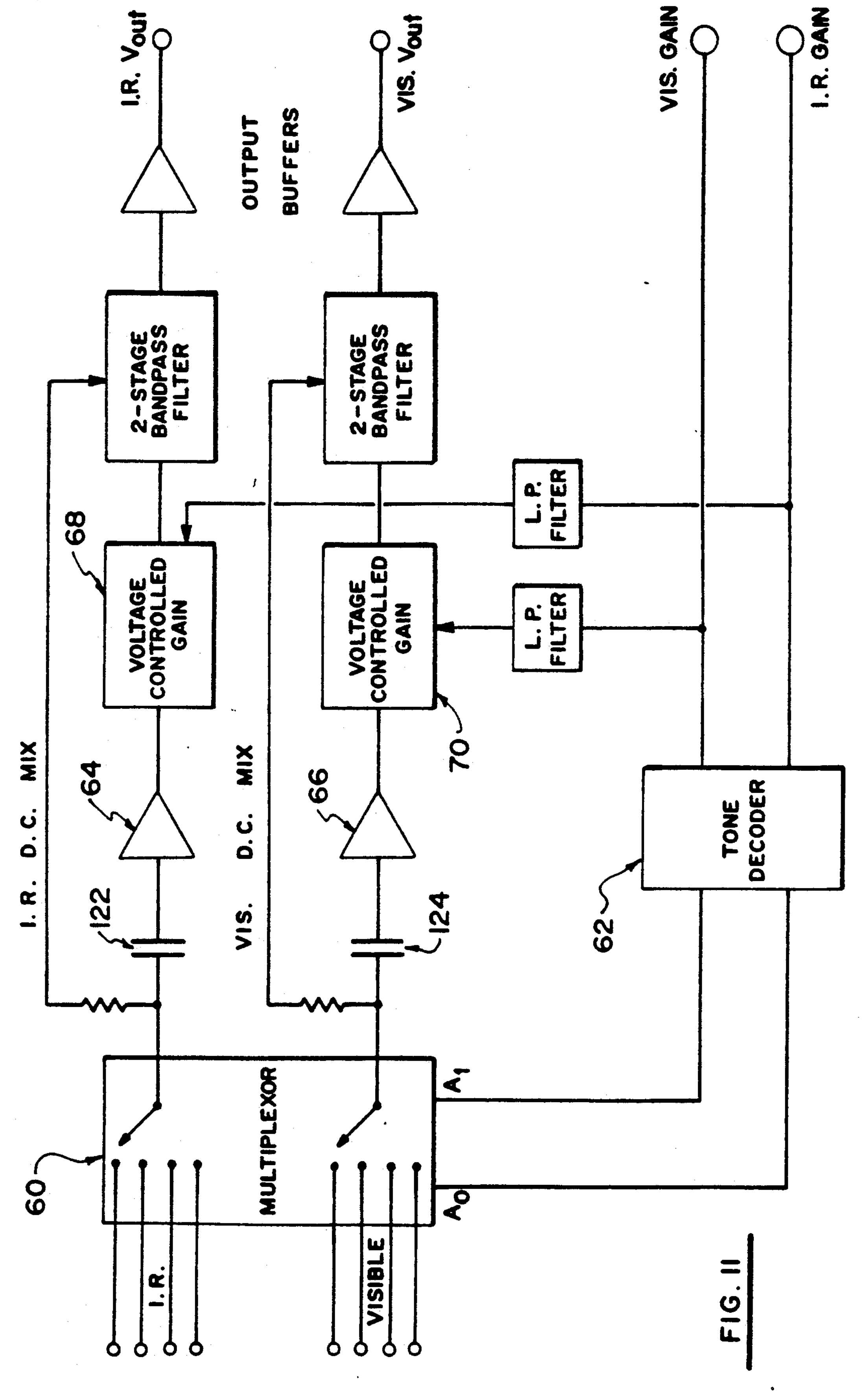
FIG. 11 is a block diagram of the construction of the flame scanner head electronics of the preferred embodiment.

The flame scanner head electronics (FIG. 11) provide signal conditioning and channel selection for up to four dual colour sensors located in the scanner head. The printed circuit board on which the electronic components are mounted in turn mounts in the scanner head barrel, and is shielded using a mu-metal cylindrical tube which attaches to the mounting rods.

The outputs of the dual colour (visible and infra-red) sensors are routed to the inputs of a dual, one-of-four analog multiplexer 60 whose channel select address is determined by two address lines A0, A1. Two input control signals (visible and infra-red gain/channel selects) are provided for remote selection of the sensor address. A frequency encode scheme is implemented to select the desired sensor address. The presence of a 10 kHz carrier on a control line is detected by dual channel tone decoder 62, which translates this carrier frequency into a TTL logic level for selecting the multiplexer address.

The outputs of the selected sensor are fed to pre-amplifier and decoupling stages. Pre-amplifiers 64, 66 provide high initial signal gain. An NE570 based compander stage 68, 70 provides further gain amplification with the overall A.C. gains controlled by voltage controlled gain (VCG) inputs. The VCG section gains are determined remotely via two control inputs. A 60 dB gain/attenuation range is achieved, ensuring no signal saturation over extremes in flame brightness and flicker content.

The outputs of the VCG stage are bandpass filtered to provide a frequency sensitive gain characteristic whose gain is proportional to frequency in the range 10 Hz$\leqq$freq$\leqq$500 Hz. Above 500 Hz the signals are attenuated at $-30$ dB/octave to remove high frequency noise components. The D.C. components of the sensor outputs are fed forward to the second low-pass stage of the filter section to provide flame brightness information. The filter outputs are then buffered and routed to a remote processor (i.e. computer) over shielded twisted pair cable.

The scanner electronics can be configured to meet particular gain characteristics by choosing intermediate stage gains as required. Lead sulphide/silicon, lead selenide/silicon and germanium/silicon dual colour sensors can be accommodated, although a single combination is preferred in any one scanner head.

Detailed Circuit Description

The design of the dual colour sensor circuit electronics is essentially identical for the infra-red and visible channel signal conditioning. The only significant difference is that the visible (silicon sensor) channel incorporates a dual gain mode to accommodate the wide dynamic range experienced when monitoring both coal and oil flames. Both the visible and infrared circuit are A.C. coupled, with provision made for feeding the D.C. component forward to an output summing stage for monitoring flame intensity.

Pre-amplifier Stage

Figure 12A:
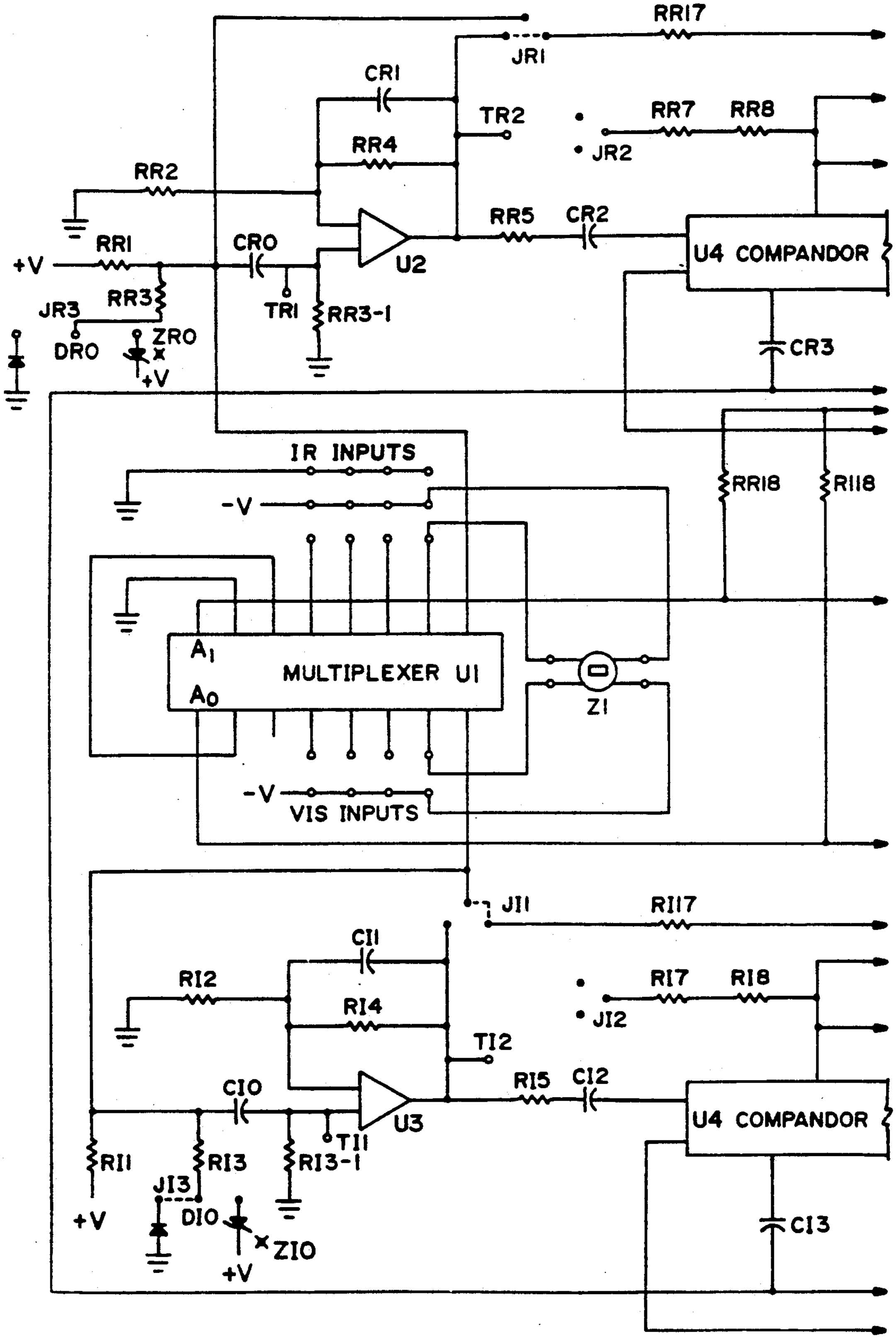
FIGS. 12*a*, 12*b*, and 12*c* are an electronic circuit schematic diagram of the flame scanner head electronics of the preferred embodiment.
Figure 12B:
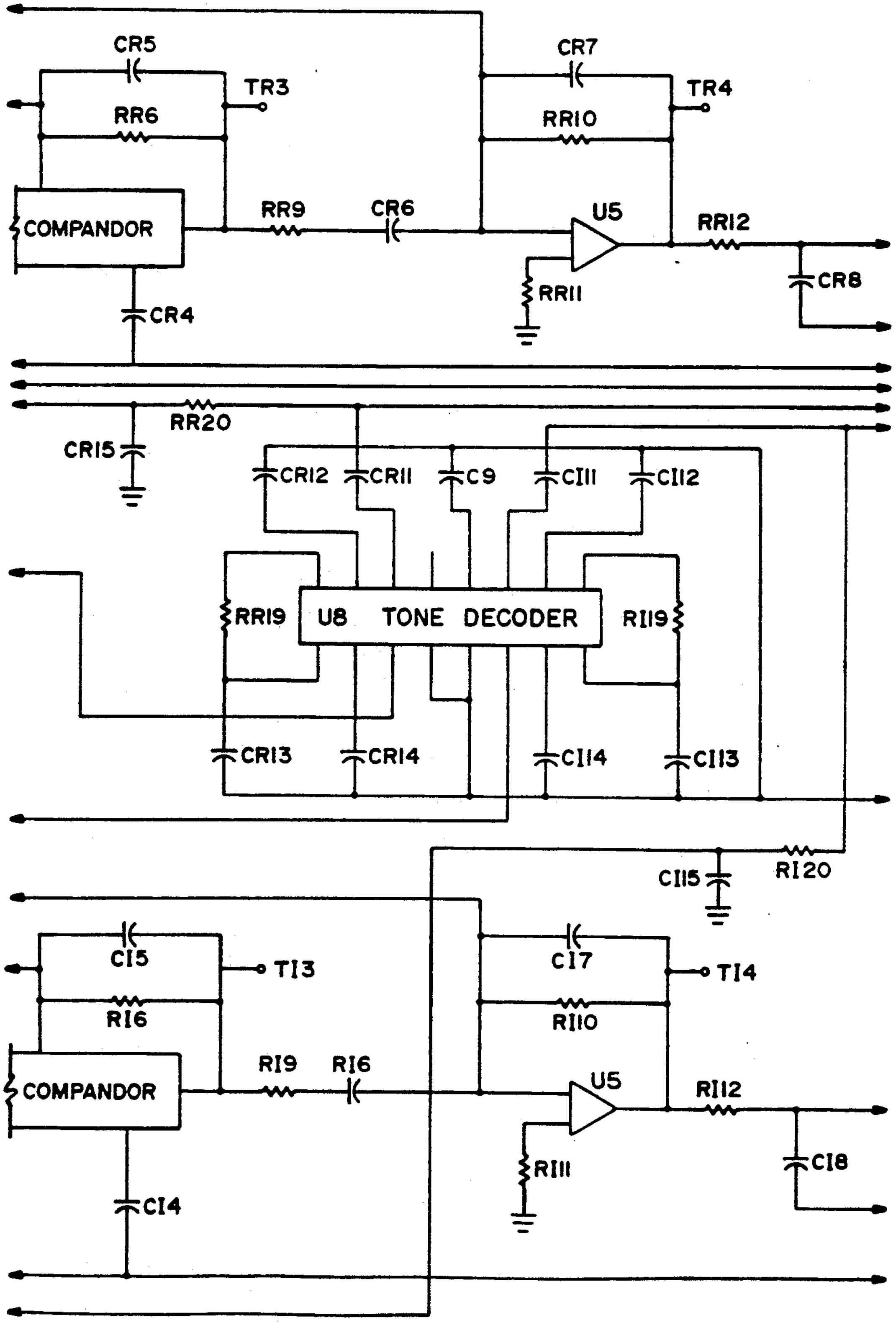
Figure 12C:
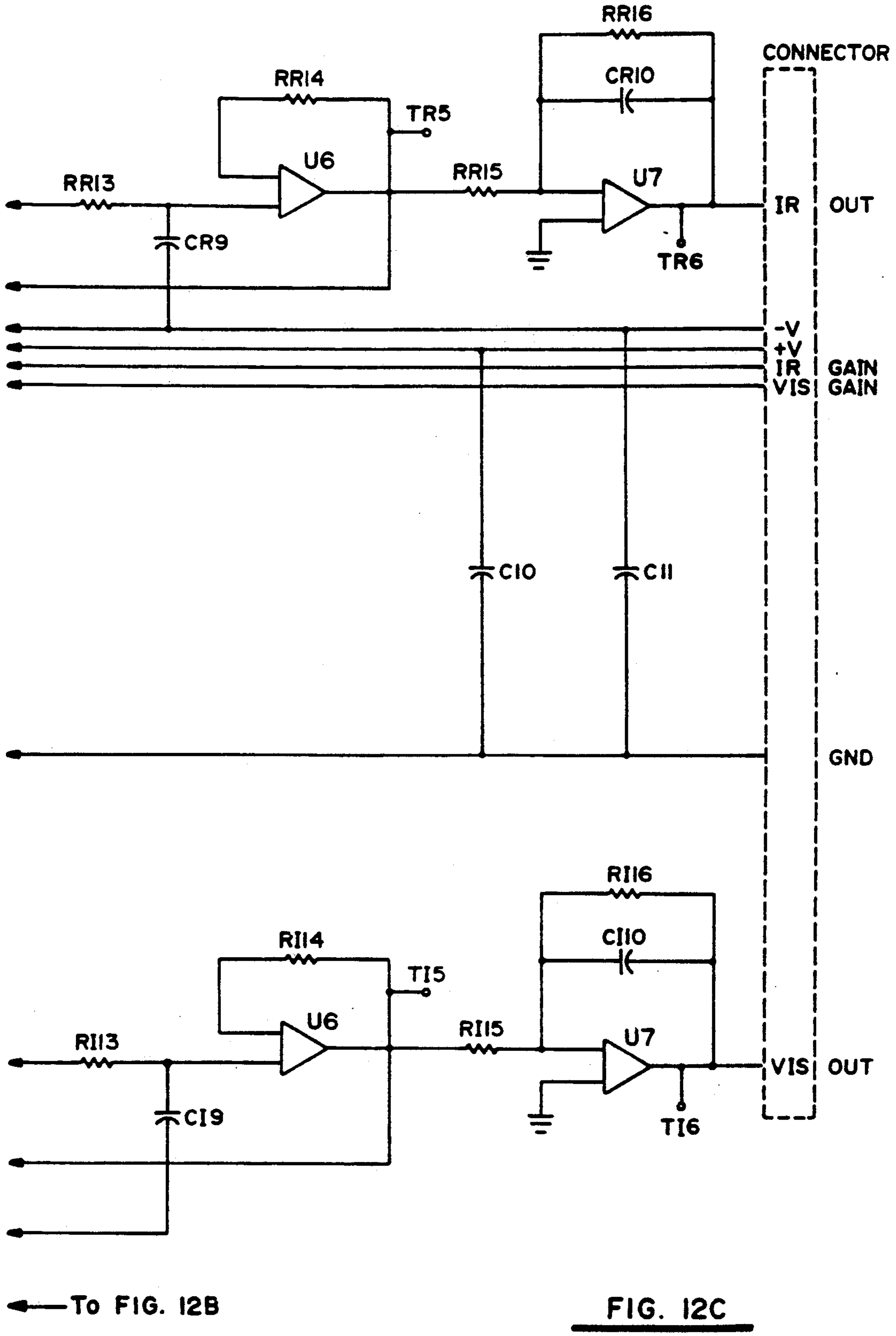

As depicted in FIG. 12, outputs DRA, DRB of analog multiplexer $U_1$ are A.C. coupled via capacitors CRO and CIO to non-inverting amplifiers U2, U3. The sensor outputs are biased to +V by resistors RR1, RI1, with an optional dual gain mode achieved by zener diode/resistor pairs ZR0, RR3 and ZI0, RI3, This secondary gain mode is only operational under very bright conditions, when the zener diodes conduct. Under these conditions the sensor outputs are essentially attenuated by the ratios (RR3/RR1), (RI3/RI1).

The pre-amplifier stage gains are determined by feedback resistors RI4, RI2 and RR4, RR2. The pre- amplifier bandwidth is limited to about 1 kHz by feedback capacitors CR1, CI1.

Voltage Controlled Gain Stage (VCG)

A dual channel NE570 compander integrated circuit U4 provides voltage controlled gain characteristic. Resistor, capacitor pairs RR5, CR2 (infra-red) and RI5, CI2 (visible) together with the variable impedances of the input voltage controlled stages determine the channel gains and low frequency A.C. coupled response of compander U4. The inverting inputs of Compander U4 are configured as summing junctions with overall gain and high frequency roll-off determined by feedback via RR6, CR5 (infra-red) and RI6, CI5 (visible). The bias resistors RR7, RR8 and RI7, RI8 are chosen to minimize D.C. output offsets over the complete controlled gain range.

The gain control voltages are set to $V_{DD}+1.8$ volts for minimum gain, with maximum gain at 0 volts. Typically, $V_{DD}$ is in the range of $-15V_{DD}\leqq-12V$. The low-pass filtering provided by RR20, CR15 and RI20, CI15 blocks the 10 kHz carrier signal which may be present on the channel select/gain control inputs. Capacitors CR3, CI3 limit the speed of response in channel gain to changes in the D.C. level of the gain control inputs.

Signal Conditioning (Pre-emphasis Filter)

The outputs of the VCG stages are bandpass filtered. The filter characteristics are chosen such that gain is approximately proportional to frequency in the range 5 Hz$\leqq$freq$\leqq$500 Hz.

The VCG stage outputs are first high-pass filtered by U5 with the high-pass (derivative) mode time constant determined by RR10, CR6 (infra-red) and RI10, CI6 (Visible). The high-pass stage gains are limited by resistors RR9, RI9 and capacitors CR7, CI7. Provision is made for D.C. coupling the sensor outputs directly via resistors RR17, RI17. These resistor values are chosen such that ±full scale D.C. output on the sensor results in ±2 volt offsets on the outputs of filter U5. The second stage pre-emphasis filter U6 is designed as an under-damped low-pass stage which limits the high frequency response while at the same time providing signal enhancement in the frequency range 250 Hz$\leqq$freq$\leqq$500 Hz. The damping ratio is determined by capacitor pairs CR8,CR9 (infra-red) and CI8, CI9 (visible). Overall unity D.C. gain is maintained through the VCG stages.

Output Buffering

The output buffer stages associated with amplifier U7 are configured as inverting buffers with 1 kHz, first order low-pass roll-off. Resistor/capacitor pairs RR17, CR9 (infra-red) and RI17, CI9 (Visible) determine the low-pass time constants. Resistors RR15, RI15 determine the stage gains.

Analog Multiplexer and Channel Select

The 10 kHz carrier frequencies for multiplexer channel select are A.C. coupled via CR11, CI11. The centre frequencies for dual channel tone decoder U8 are set by resistor/capacitor pairs RR21, CR13 (infra-red) and RI21, CI13 (Visible). The bandwidth (i.e. frequency range about the centre frequency in which the tone decoder responds) is determined by capacitors CR14, CI14 and is set to approximately ±500 Hz. The tone decoder outputs provide a 2 bit address select (A0, A1) for multiplexer U1.

Mode of Operation

A remote controller selects the input channel and adjusts the output gain via two gain/channel select input lines. The intended mode of operation assumes gain and channel select are held constant over a measurement interval which is determined by the flame detection algorithm. If channel selects are changed then time (about 40 milliseconds) must be allowed for the channel outputs to reflect the new signal source values. This time is determined by the multiplexer and filter transient decay times.

Similarly, a change in channel gain, initiated by varying the input D.C. control voltage on the appropriate gain input line, results in an exponential response in the overall gain of compander 4 due to smoothing capacitors CR7, CI7. Reducing the size of these capacitors speeds up the response of the VCG gain sections. However, to retain 60 Hz rejection it is recommended that the gain time constants be <100 msec, where the time constants are given by:

$$T_{GAIN}=C_{GAIN}\,10^4 \text{ seconds}$$

The dual gain mode capability provided by RR3, ZRO on the infra-red channel and RI3, CI0 on the visible channel should be selected such that the circuits operate in mode 1 (high gain, diodes non-conducting) when monitoring coal flames, and in mode 2 (low gain, diodes conducting) when monitoring auxiliary flames fuelled by oil or gas. The selection of zener diode voltage and resistor values is location dependent.

Flame Detection Algorithm

Types of Flame Conditions

In general there are four flame conditions or classes of flame to be detected in a multi-burner boiler. These are:

(1) Main fuel flame from the individual burner being monitored ("MAIN FLAME").

(2) Flame from the auxiliary or igniter burner associated with the main burner ("AUX. FLAME"). (3) Fireball or background flame from other burners ("FIREBALL").

(4) Flame out condition on both the main and auxiliary burners ("FLAME OUT").

In most situations an attempt is made to discriminate flame for the particular burners (main and auxiliary) being monitored. This is desirable but not always possible when other burners are present and contributing to the boiler firing state.

Monitoring Using Multiple Scanners

Although in most situations only one scanner head is required for each burner, there are situations when two scanners may be used to improve flame discrimination. It is also possible for more than one sensor to be mounted in a scanner head. In general each burner flame is characterized by "M" separate data signals, all fed to the same central processor and sampled in parallel to retain their time coherent properties. These M signals may be obtained from one or more scanner heads, each equipped with one or more multicolour sensors.

Spectral Estimation and Notation

The general case assumes "m" sensor input signals These input signals $x_1(t) \ldots x_m(t)$ are sampled "N" times in each of "k" block periods ($k=1,2 \ldots$), each block being of duration "T" seconds The $i_{th}$ sample point ($i=0, 1, 2 \ldots (N-1)$) on the $j_{th}$ time signal $x_j$ ($j=1, 2, \ldots M$), in time block $T_k$, is denoted by $x_{jk}(i)$.

The complex discrete Fourier transform of a sampled signal $X_j$ for the $k_{th}$ sample block is denoted by:

$$X_{jk}[L] = DFT[x_{jk}(i)] = \sum_{m=0}^{N-1} x_{jk}(m)\exp(2\pi iLm/N)$$

where:

"i" is the complex root of $(-1)$;

"L" $L=0,1,2 \ldots N/2-1$ is the $L_{th}$ harmonic component at frequency (L/T) Hz;

"$X_{jk}[L]$" is complex; and,

"DFT[ ]" is the discrete Fourier transform operator. Bolded notation is used to denote frequency domain variables.

The discrete auto-power spectrum density estimate for a signal $x_j$ on time interval $T_k$ is given by;

$$S_{jjk}[L]=X_{jk}[L]^{*}\cdot X_{jk}[L] \quad L=0,1,2 \ldots N/2-1.$$

where the superscript "*" denotes the complex conjugate.

The discrete cross-power spectrum density estimate between signals $x_j$ and $x_i$ on time interval $T_k$ is given by:

$$S_{ijk}[L]=X_{jk}[L]^{*}\cdot X_{ik}[L] \quad L=0,1,2 \ldots N/2-1.$$

The discrete estimate of the modulus squared transfer function between signals $x_j$ and $x_i$ on time interval $T_k$ is given by:

$$H_{jik}[L]=(S_{jik}[L]^{*}\cdot S_{jik}[L])/(S_{jk}[L]\cdot S_{jk}[L])$$

where $L=0, 1, 2 \ldots N/2-1$.

The discrete estimate of the modulus squared coherency function between signals $x_j$ and $x_i$ on time interval $T_k$ is given by:

$$C_{jik}[L]=(S_{jik}[L]^{*}\cdot S_{jik}[L])/(S_{jk}[L]\cdot S_{ik}[L])$$

where $L=0, 1, 2 \ldots N/2-1$.

Estimates may be averaged over adjacent frequency bands and/or over successive time block intervals. The software employed in the preferred embodiment allows the user to choose up to 9 separate frequency bands for frequency smoothing and to obtain long term time averaged estimates in these frequency bands using an exponential first order averaging factor (digital low pass filter). Two estimates are updated in every time block interval. Firstly, a frequency smoothed estimate is obtained from the last time block interval. This estimate is given by:

$$E_{filter} = 1/M \sum_{L_1}^{L_2} E_{last}(L)$$

where L is the harmonic number; $M=L_2-L_1+1$, $L_2 \geqq L_1$; and up to nine filters are specified, each with independently specified limits $L_1$, $L_2$. Secondly, a frequency and time averaged estimate is obtained from the last "k" intervals as determined during setup. The time averaged estimate is given by:

$$E_{ave}=\delta E_{old}+(1-\delta)E_{last}$$

where $E_{ave}$ is the new averaged estimate; $E_{old}$ is the previous averaged estimate; $E_{last}$ is the latest estimate; and, δ is the averaging time constant.

The frequency smoothed last block estimate $E_{last}$, and the time averaged estimate $E_{ave}$ consist of estimates of the auto-spectra, cross-spectra, squared coherency and modulus squared transfer gain functions in each of nine frequency bands, $f_L$, $L=0, 1, 2, \ldots 8$. These estimates are, in reality, a set of measurements including:

(1) Auto-spectra estimates $S_{jj}[L]$ of signals $j=1, 2, \ldots M$ for filters $L=0, 1, \ldots 8$.

(2) Squared Modulus Transfer function estimates $H_{ji}[L]$, between signals $X_j$ and $X_i$; $j,i=1,2, \ldots M$.

(3) Squared coherency function estimates $C_{ji}L]$; $j,i=1, 2, \ldots M$.

where $L=0,1,2,3,4,5,6,7,8$—the preset frequency bands of interest.

The measurements are corrected to account for preset channel gains which are adjusted on the scanner heads prior to commencing each block of time samples. The averaged transfer function and coherency estimates are obtained by first averaging individual estimates of the cross-spectra and the auto-spectra and then dividing the resulting averaged cross-spectra products by the appropriate auto-spectra.

In addition to the long term average and last block estimates, the variance of estimates about the long term average is also calculated as:

$$E_{var}=\delta E_{var\text{-}old}+(1-\delta)\,[E_{ave}-E_{last}]^2$$

where $E_{var}$ is the new estimated variance; $E_{var\text{-}old}$ is the previous estimated variance; and $E_{ave}$, $E_{last}$ and δ are as previously defined. The averaging time constant δ is chosen such that $0.01 \leqq \delta 1.0$. The standard deviation of estimates is then simply calculated as:

$$E_{dev} = \sqrt{E_{var}}$$

The variance and/or standard deviation can then be used to detect the onset of unstable flame conditions;

usually characterized by large fluctuations about a normal operating point.

Scanner Flame Detection Sequence

The flame detector is operated in one of three modes:

(1) learn flame signature;

(2) monitor flame; or, (3) self test.

In the first ("learning") mode, the flame detector identifies the statistical properties of spectral estimates and stores these characteristic measurements as being typical of one of the four flame conditions outlined above. The amplitude probability distributions of the spectral estimates, as well as the minimum, maximum, average and variance values of these functions in each of the frequency bands are calculated. These are stored as signatures characteristic of the particular flame conditions.

In the second ("monitoring") mode, the flame detector compares latest flame spectral estimates against prestored flame signature characteristics and outputs a measure of "flame on" confidence for the main, auxiliary and fireball flame conditions. These three "flame on" confidence levels are compared against individual "flame" and "no flame" setpoints to determine the corresponding flame contact output status. The setpoints have a variable dead band characteristic to avoid contact output chatter.

In the third ("self test") mode, known signals are fed to the scanner heads in a loop back mode to check system integrity.

Figure 13A:
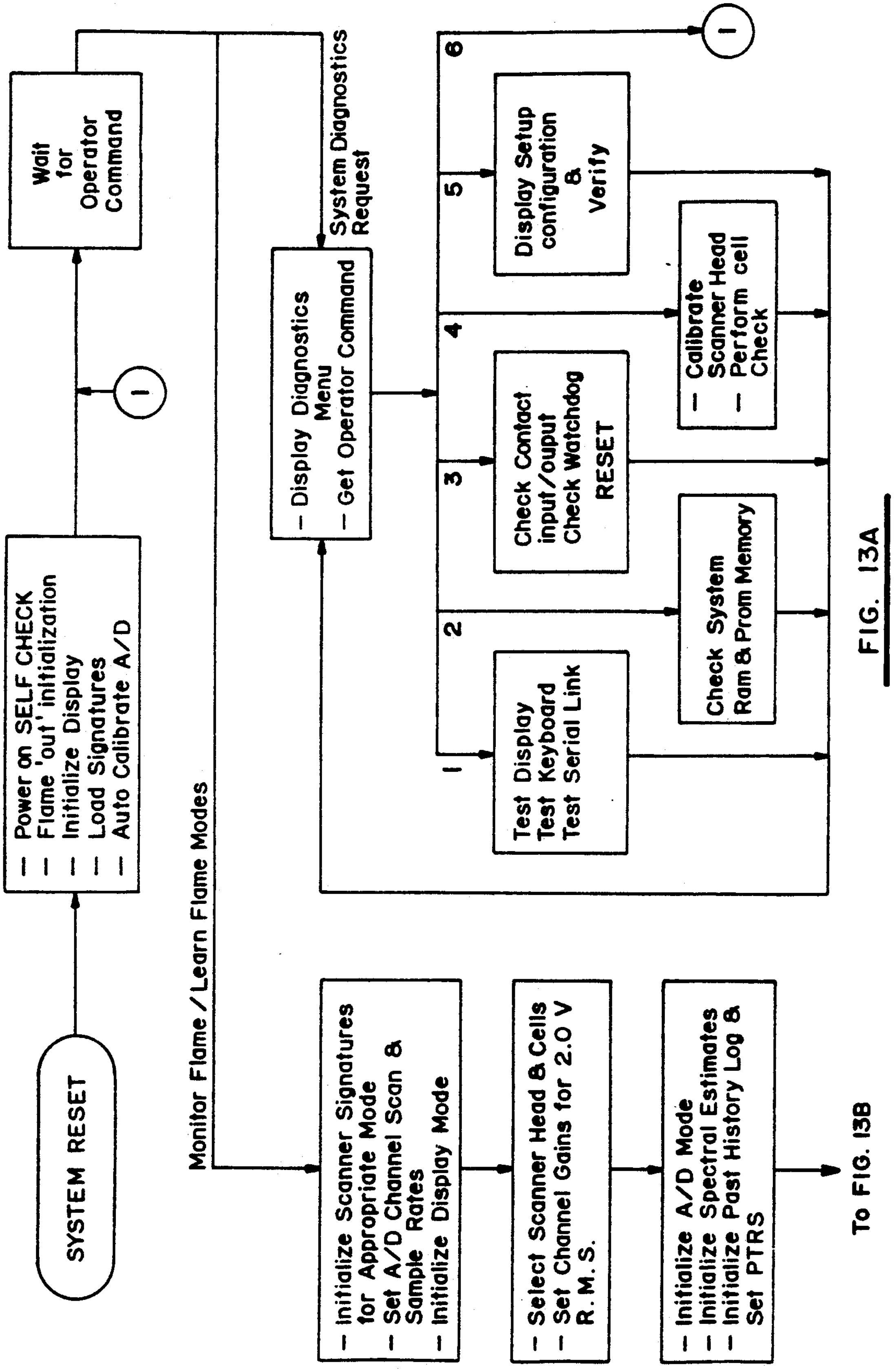
FIGS. 13*a*, 13*b*, and 13*c* are a flowchart of the flame detection algorithm which controls the operation of the preferred embodiment of the invention.
Figure 13B:
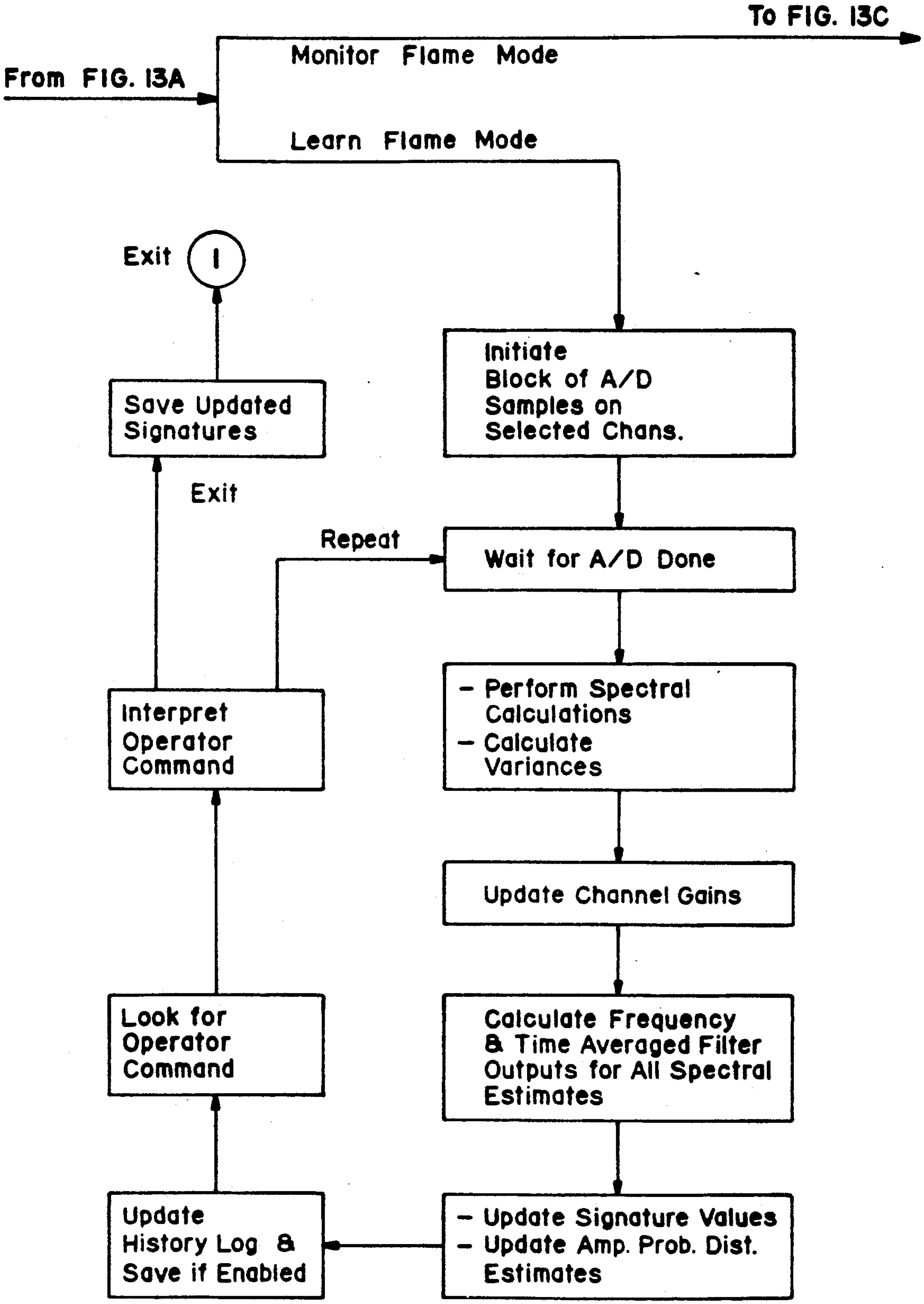
Figure 13C:
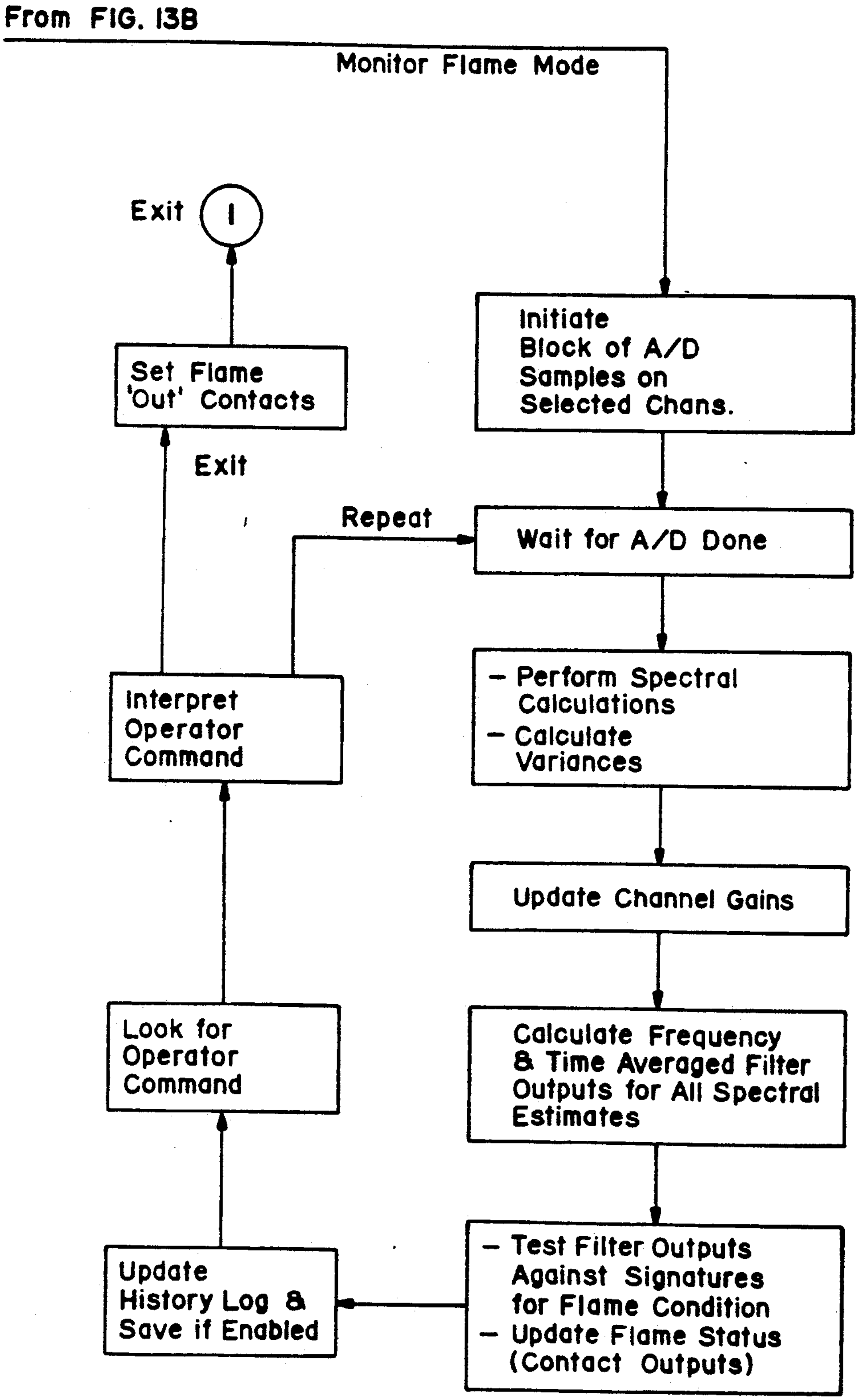

A block overview of the scanner software logic is shown in FIG. 13.

Scanner Head Initialization

Before commencing flame monitoring, the flame detector's co-processor selects the designated sensors in the scanner heads (1 of 4 in each head) and adjusts the sensor gains to achieve good signal to noise levels at the A/D converter. The sensor gains are controlled by varying the output voltages on two D/A channels. These voltages are fed to the voltage controlled gain sections on the scanner head electronics. The sensor selection in each head is achieved by the co-processor transmitting two frequency modulated carrier signals (10 kHz carriers) superimposed on the D.C. gain signals. These signals are decoded by the scanner head electronics as a two bit address for the front end multiplexer. Loop integrity is also checked by transmitting a second carrier at a lower frequency ($<500$ Hz) which is then amplified by the scanner head electronics and received on the incoming data channels. The channel gain calibration can be verified as well as overall signal integrity using this secondary carrier. The channel gains are adjusted to achieve a signal strength of approximately 2.0 volts R.M.S. from the sensor. This ensures good signal to noise ratios over the transmission cable, while avoiding saturation problems on the A/D converter. The A/D converter's full scale range is $\pm 10$ volts.

Data Acquisition

The analog data from the scanner sensors usually consists of two data channels, $x_1$, $x_2$, corresponding to signals representative of the flame emissions in an infrared and a visible wavelength band. Up to 4 signals can be accommodated. This situation arises if:

i) more than one sensor is selected simultaneously; or, ii) a multicoloured sensor as opposed to a dual colour sensor is used (eg: Si/Ge/PbSe); or, iii) a sensor array and chromatic beam splitter are used; or, iv) more than one scanner head is installed.

The discussion of the flame detection algorithms will be limited, without loss of generality to the bivariate case. As previously explained, the signals are sampled in blocks of N sample points, where N is usually chosen to be $2^M$, consistent with a radix 2 based discrete Fourier transform (DFT). The sample block mean values are calculated and subtracted. These mean levels, or D.C. components, are measures of flame brightness and may be tested as indicative of flame condition in a similar manner to the spectral estimates. The sample blocks are optionally preprocessed using a Hanning time window to suppress side-band leakage inherent in short period DFT analysis (see: Bendat J. S., Piersol A. G., "Random Data: Analysis and Measurement Procedures," Wiley Interscience 1971 Library of Congress #71-160211).

Signal Processing Algorithms

The spectral estimates, as described above, are estimated for the nine selected frequency bands. These bands are arbitrarily chosen and may or may not be contiguous. The spectral outputs, as estimated in these frequency bands, are termed filter outputs. The only restrictions on the choice of filter characteristics are:

i) For each filter the low-frequency/high-frequency cutoffs must lie in the range $0.0 < f_{cutoff} <$ sample frequency/2.

ii) The cutoff frequencies are discrete harmonics of (1/T) Hz where "T", the block sample interval, is the frequency resolution of the DFT analysis.

Both last block spectral estimates and long term time averaged spectral estimates are calculated and updated after each block of time samples has been stored.

In the "learning" mode, the signature maxima, minima, variance, and average values and the individual amplitude probability distribution functions are updated for each of the spectral estimators (auto-spectra, squared modulus gain and squared coherency) in each of the filter output bands. These values are later saved as signatures indicative of the flame condition being monitored.

In the "monitoring" mode, the latest and/or long term average spectral estimates are compared with one or more previously stored signatures. The maximum number of signatures is limited only by the available storage memory and by real time processing constraints. Each comparison yields a probability match figure in the range of $0 < \text{match} < 1.0$. The best match obtained for each of the three flame types (main flame, auxiliary flame and fireball) is used as an indication of the respective flame status. Thus, several signatures indicative of main flame may be tested and the best fit used for signalling the main flame status. If the flame "match" is greater than the "FLAME-ON" setpoint for that type of flame the flame status is signalled "ON". If the flame "match" is less than the "FLAME-OFF" setpoint then the flame status is signalled "OFF". If the "match" is between the "FLAME-ON" and "FLAME-OFF" setpoints the flame status remains unchanged. Initially flame status is signalled "OFF".

Flame Condition Contacts

Four flame contact output relays are provided. These are:

main flame status
auxiliary flame status
fireball status
online/offline status

In addition, four contact inputs are provided. These are usually designated:

main fuel status
auxiliary burner fuel status
master enable/disable
self test.

The status of the contacts is updated after every block of data samples and after every test of flame condition.

Scanner Gain Adjust and Cell Selection

The flame detector channel gains are updated after each block of data is sampled. The gains are calculated based on the signal variances measured in the previous block of samples. The channel gains are maintained constant during block sampling to avoid bias errors occurring in the spectral estimates. Similarly, the scanner sensor selection may be updated between sample block intervals, to better locate the position of the primary combustion zone of the burner flame. The scanner tries to locate the flame using the sensor with the viewing window closest to the burner nozzle. Where multiple sensors are installed, failure to find flame close to the burner will result in the selection of the next appropriate sensor as determined by the user prior to commencing scanning. The sensor selection sequence may be determined by spatial considerations and by contact input fuel status information. The latter is appropriate where the igniter or auxiliary burner has a very different flame pattern from the main burner and requires the use of a different viewing window to improve flame discrimination. When monitoring more than two analog channels (which allows the simultaneous monitoring of more than one sensor), the only restrictions are the number of analog channel inputs provided (four are provided in the preferred embodiment herein described) and the real time processing delay incurred by the estimation of spectral filter outputs on multiple channels.

Learning Flame Signatures

Each flame condition is characterized by a spectral flame signature measured in terms of the:

maximum filter output;
minimum filter output;
average filter output;
variance and/or standard deviation of the filter output about the average; and,
amplitude probability distribution.

Each spectral function in each filter band is characterized in this manner. The flame condition can be representative of a particular firing condition or a range of firing conditions such as might be encountered by varying firing air flow or fuel flow. Particular flame conditions of interest can be singled out if necessary to provide better flame discrimination.

Signature Classifications

Flame signatures are classified as being indicative of one of four flame conditions:

i) Main burner flame; or,
ii) Auxiliary burner flame; or,
iii) Fireball flame; or,
iv) Flame out.

The main burner flame is the flame associated with primary fuel burner. The auxiliary burner flame is the flame associated with the igniter or secondary burner. The fireball flame is any flame whose characteristics cannot be attributed purely to the burners being monitored. Other burners may contribute to the fireball characteristics. Flame out conditions are characterized by the absence of any of the first three flame conditions. Unfortunately, the one flame condition that is of interest, must be avoided (i.e. flame out with fuel still being supplied to the burner). This condition is not available for classification in terms of a flame out signature, as operation of the boiler under these conditions constitutes a safety hazard. Several signatures of each type of flame may be required to completely characterize the normal firing situations on the burners.

Multiple Signature Testing

When more than one flame signature is used to test for the flame condition, the latest spectral estimates and/or time averaged estimates are matched against each signature in turn. The best "fit" for each flame type is returned as the flame condition for that flame type. However, the probability of any flame type being "ON" is constrained to be less than (1.0—probability of flame out) as determined by matching the flame spectral estimates against all flame out signatures. This ensures contradictory flame condition indications err on the side of safety.

Monitoring Burner Flames

There are many ways to compare the latest spectral estimates of a flame output with previously stored characteristic signatures. However, only a limited number of comparison techniques lead to robust flame detection algorithms. As noted above, several flame signatures may be compared to detect a specific flame status. Each comparison involves deriving a measure of fit between a current measure of the flame and a previously stored flame signature. By convention it is convenient to express this measure of fit as a normalized probability in the range $0 \leqq prob \leqq 1.0$. The various comparison algorithms will now be described in detail.

Signature Comparison Algorithms

The spectral estimation algorithms and the methods used to obtain smoothed estimates of the auto-spectra, transfer gains and coherence in each of nine spectral bands were described above. The discussion was presented for the general case of several data signals. The information gathered when learning a flame signature has also been described above. In particular average, maximum, minimum and the variance of spectral estimates are recorded together with the individual amplitude probability distributions of each of the estimates. Strictly speaking, a true test of the measure of match of an estimate vector X ($\in R_n$) with a previously stored signature vector Z ($\in R_n$) requires knowledge of the n dimensional joint probability distribution, p(Z), of estimates of Z. This is only equal to the product of the individual probability distributions, p(z1)·p(z2) . . . p(zn) (where z1 . . . zn are members of Z), if the estimates zi (i=1. . . n) are statistically independent. It is then a simple matter to retrieve the probability of an estimate X being representative of the set Z, from the joint distribution characteristic previously stored. The probability is normalized to the maximum probability, $P_{max}$, and the returned measure of fit is then in the required form. Unfortunately, the data memory storage requirements needed to approximate the true joint probability distribution sufficiently precisely make this approach unrealistic for large dimension, n, vectors. Furthermore, the resulting flame detection algorithm tends not to be robust.

Four alternative comparison techniques have been developed. The choice of comparison technique to apply for each signature test is made by the operator and is stored as part of the information contained with each signature record. The operator is not limited to using just one technique for all the estimates in a signature test. Each spectral estimate in each filter band may be tested using any of the four methods proposed. The overall measure of fit is then obtained as a weighted averaged of all the individual measures of fit.

Weighted Least Squares Fit

An estimate, x, is compared with a signature value, z, as follows: Given signature values for z of:

Zave = average signature value of z.
Zmin = minimum signature value of z.
Zmax = maximum signature value of z.

Case 1 = = $Z_{min} < x < Z_{ave}$
$e = (x - Z_{ave})^2$.
$e_{max} = (zmin - Z_{ave})^2$.
$p(x) = 1.0 - e/e_{max}$. : Probability of estimate x being a measure of the signature z.

Case 2 = = $Z_{ave} < x < Z_{max}$
$e = (x - Z_{ave})^2$.
$e_{max} = (Z_{max} - Z_{ave})^2$.
$p(x) = 1.0 - e/e_{max}$. : Probability of estimate x being a measure of the signature z.

Case 3 = = $(x < Z_{min})$ or $(x > Z_{max})$
$p(x) = 0.0$

The returned probability of fit is just a measure of the distance squared between the estimate x and the average signature value, $Z_{ave}$. If the estimate x is less than the minimum value of z or greater than the maximum, then a zero probability of fit is returned. The lower and upper bound limits are usually those found by experiment, but they may be replaced or forced to other values to improve the test response where this can be justified. As an example, if there is no penalty required if a measure of the auto-spectrum of a flame signal for a particular filter exceeds the average value, then the previously measured maximum limit can be replaced by a very large value so that all estimates that exceed the average return an approximate fit probability of 1.0. Similarly, the lower minimum limit might be replaced if the test is to determine a flame out characteristic, where lower amplitude estimates indicate a darker boiler with less background flame.

Stochastic Fit

Given a discrete approximation, p(z), to the amplitude probability distribution of a signature value z, the normalized probability of obtaining an estimate, x, is obtained as follows. Let the discrete representation of p(z) be denoted by the set of points p[i], i = 0,1,2, . . . n, where $p[i] = \text{prob}\ \{Z,\ Z_{min} + i \cdot \delta < Z < Z_{min} + (i+1) \cdot \delta\}$ $\delta = (Z_{max} - Z_{min})/n$ = = discretization resolution and
$\Sigma p[i] = 1.0$ = = total probability normalized to unity.

The normalized probability of obtaining an estimate, x, is just $(p[j]/p_{max})$, where the index j is given by:

$j = \text{int}\ ((x - Z_{min})/\delta)$
and $p_{max} = \max\ \{p[i],\ i = 0 \ldots n\}$.

If j is less than zero or greater than n then the probability is assumed to be zero. The probability distributions associated with individual signature spectral estimates are calculated during the learn flame operating mode.

Bounded Limits

A third method of obtaining a measure of the fit between an estimate, x, and the signature value z is obtained by using a similar test to the least squares method described above, except that the weighting function is no longer based on the squared error law. The general formulation can be presented as follows. As before, given signature values for z of:

Zave = average signature value of z.
Zmin = minimum signature value of z.
Zmax = maximum signature value of z.

Case 1 = = Zmin < X < zave
let $e = |X - Z_{ave}|$.
$e_{max} = |Z_{min} - Z_{ave}|$.
$p(x) = 1.0 - f(e/e_{max})$: Probability of estimate x being a measure of the signature z;

where the function $f(\cdot)$ is defined for all values in the range 0 . . . 1 and is normalized such that:

$f(0) = 0$
$f(1) = 1$
$0 \leq f(\cdot) \leq 1.0$

Case 2 = = $Z_{ave} < X < Z_{max}$
$e = |X - Z_{ave}|$.
$e_{max} = |Z_{max} - Z_{ave}|$
$p(x) = 1.0 - f(e/e_{max})$: Probability of estimate x being a measure of the signature z.

Case 3 = = $(X < Z_{min})$ or $(X > Z_{max})$
$p(x) = 0.0$

The functions $f(\cdot)$ implemented in the preferred embodiment are:

i) Uniform weighting [$f(x) = 1.0\ (0 < x < 1.0)$];
ii) Square law (as given above under "Weighted Least Squares Fit");
iii) Triangular weighting [$f(x) = x;\ (0 < x < 1.0)$]; and,
iv) Cubic weighting [$f(x) = x^3$].

As discussed above, the $z_{min}$ and $z_{max}$ limits can be artificially extended to give a one sided limit test if required.

Gaussian

The last test assumes a Gaussian probability distribution for estimates, x, of the signature z, with standard deviation $Z_{dev}$ and mean value $Z_{ave}$. The standard deviation is calculated during the "learning" mode for each of the spectral estimates. In this case the probability of obtaining x is given by:

$$p(x) = exp((x - Z_{ave})^2 / Z_{dev}^2)$$

The probability is normalized to the maximum probability p(0). The assumption of a Gaussian distribution is justified for auto-spectra estimates which are averaged over adjacent frequency points or sequential time blocks where the number of points used for averaging is large ( >20). For estimates of the modulus squared transfer gain and squared coherence it can be shown that the distribution of log(x) for these functions is more nearly Gaussian than the distribution of x itself (see: Bendat J. S., Piersol A. G., "Random Data: Analysis and Measurement Procedures" supra). The operator is given the option of testing x or log(x) for these functions.

Calculation of Estimate Weighting Functions

The measures of fit returned for each of the individual spectral estimates are summed and averaged to obtain an overall fit probability for each signature to be tested. The overall fit probability is given by:

$$p_{fit} = \Sigma w[i] \cdot p(x[i]) \text{ for all estimates } x[i].$$

The weights, w[i], are normalized so that $\Sigma\, w[i] = 1.0$. The choice of the weighting function determines how much importance is given, in relative terms, to the auto-spectra, transfer gain and coherence estimate errors for each filter output. Where a particular signature average estimate, $Z[i]_{ave}$, for a flame "ON" condition is very different from all measures of flame "OFF" for that estimate, the assigned weight is correspondingly large. When the flame "ON" to flame "OFF" difference is small the weight attached is small.

Given flame "OFF" signatures Z[j], j=0,1,2 . . . m, and a flame "ON" signature X, the flame "ON" to flame "OFF" distance for an estimate x[i], (x[i]≡X), is given by:

$$d[i] = min\{|x[i]ave - Z[i]ave| / Z[i]dev\}$$

where ($._{ave}$) denotes the average signature value and ($._{dev}$) denotes the signature standard deviation. The total distance measure $d_{max}$ is determined as:

$$dmax = \Sigma d[i] \text{ for all spectral functions } x[i].$$

The signature weighting functions w[i]are either calculated as:

$$w[i] = (d[i]/dmax) \text{ or as}$$

$$w[i] = (d[i]/dmax)^2$$

depending on whether a modulus or square law weighting is required. The operator may override the weighting function for any or all spectral estimates if required and manually set alternative values.

Measure of Flame Match

Signatures are obtained for four flame conditions as explained above. Each flame condition may be characterized by one or more signatures. The probability of an estimate, X, belonging to a particular flame type is given by:

$$\text{Probability of flame type} = max\ \{pfit[i]\}$$

where $p_{fit}[i]$ = Prob {X is an estimate of signature Z[i]} for all signatures Z[i] which characterize the flame type tested.

In other words, the best fit is considered to be the probability of a particular flame type. However, as noted above, notwithstanding the probabilities obtained above, the maximum probability of any type of flame "ON" condition is constrained to be less than or equal to (1.0−max. probability of flame "OFF"). This ensures flame "OFF" takes precedence over flame "ON" and that conflicts result in a flame "OFF" condition being signalled.

Orthogonality Test Modifier

Each spectral estimate X is in fact an 'n' vector. Similarly, the averaged signature estimates $Z_{ave}[i]$ are also 'n' vectors. A simple measure of the cosine of the solid angle θi between the estimate X and each signature $Z_{ave}[i]$is obtained by taking the dot vector product as follows:

$$\cos(\theta i) = \frac{X \cdot Z_{ave}[i]}{\sqrt{\|X\| \cdot \|Z_{ave}[i]\|}}$$

where "| |" denotes the euclidean norm, a scalar product representing the magnitude squared of the vector. The above estimate has the desired property $0 \leq \cos(\theta i) \leq 1.0$, and indicates the degree to which the estimate X is orthogonal to each signature $Z_{ave}[i]$. The overall measure of fit as obtained and used in the "probability of flame type" equation given above, is modified by this orthogonality factor to enforce a stricter classification on X than is obtained purely by using the tests previously outlined.

SUMMARY

The method of flame detection herein described depends on characterization of the different flame conditions in terms of characteristic spectral signatures; and on the calculation of a weighted measure of fit between a latest spectral estimate and previously stored signatures. No knowledge of the burner condition is assumed except that available from the spectral estimation process.

The procedure followed to detect flame condition is as follows:

i) Select spectral filter characteristics suitable for monitoring the flame and fuel type.
ii) Select the burner operating range and conditions for which flame is to be detected.
iii) Obtain the signatures characteristic of all the flame conditions to be monitored.
iv) Select the type of comparison tests to be used with each signature.
v) Calculate the weighting function associated with each signature.
vi) Select the spectral estimate averaging mode to be used.
vii) Collect blocks of sample points of the relevant data channels and estimate the spectral function outputs from these data.
viii) Compare the latest spectral function outputs with the previously stored signatures and obtain a measure of flame fit.
ix) Output flame condition.
x) Repeat steps (vii) through (ix).

The filter characteristics of the spectral functions may be chosen arbitrarily as low-pass, high-pass, or, band-pass with overlap between different filters if desired. The only restrictions on the choice of filter corner frequencies are those imposed by data sampling rates and the number of samples in each data block. The sampling rate should be chosen to be greater than twice the frequency of the highest frequency component in the data signals. The tests for flame "fit" may be conducted using the last block frequency smoothed estimates and/or the time averaged estimates.

The methods for estimating the measure of fit can be readily extended to include alternative algorithms such as:

- maximum likelihood
- minimax fit criteria
- true joint amplitude probability testing as outlined above.
- various function fit criteria along the lines of those discussed above under the heading "Bounded Limits".

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

LIST OF SYMBOLS $d_t$ The perpendicular distance from the optical axis to the top of the viewing window.

$d_b$ The perpendicular distance from the optical axis to the bottom of the viewing window.

D The distance along the optical axis (O) in front of the lens from the principal point ($P_p$) to the viewing window.

f The focal length of the lens at any given wavelength. All parallel rays entering the front of the lens will come to a focus this distance behind the lens.

$f_o$ The nominal design focal length of the lens at a specific wavelength ($\lambda_o$) specified by the manufacturer.

L The distance along the principal axis ($P_A$) in front of the lens from the principal point ($P_p$) to any arbitrary location.

n The actual index of refraction of the lens at any given wavelength ($\lambda$).

$n_o$ The nominal design index of refraction of the lens at a specific wavelength ($\lambda_o$) specified by the manufacturer.

O The optical axis is the path traced by a ray intersecting any point (P), usually the mid point of a finite sensor, and the principal point ($P_p$).

P A point located at an arbitrary location behind the lens.

$P_A$ The principal axis is the axis of symmetry passing through the centre of a circular lens.

$P_b$ The point of intersection on the focal plane made by a ray intersecting the bottom edge of the lens and any arbitrary point (P).

$P_f$ The focal point is the point on the principal axis ($P_A$) where all rays of any given wavelength ($\lambda$) entering the front of the lens parallel to this axis come to a focus behind the lens.

$P_p$ The principal point is the point where the principal plane is intersected by the principal axis ($P_A$). Light rays passing through this point are not diffracted.

$P_t$ The point of intersection on the focal plane made by a ray intersecting the top edge of the lens at any arbitrary point (P).

R The distance from the principal point ($P_p$) to any arbitrary point (P).

$r_o$ The actual radius of curvature of a lens.

$r_1$ The radius of curvature of the front surface of a convex lens.

$r_2$ The radius of curvature of the rear surface of a convex lens.

$r_b$ The path of the light ray passing through the bottom of the lens and through the principal point ($P_p$).

$r_t$ The path of the light ray passing through the top of the lens and through the principal point ($P_p$).

$r_m$ The path of the light ray passing through the middle of the lens and through the principal point ($P_p$).

tc The centre thickness or the lens.

te The edge thickness of the lens.

X The distance along the principal axis ($P_A$) behind the lens from the principal point ($P_p$) to any arbitrary location.

Y The perpendicular distance from the principal axis ($P_A$) to any arbitrary location behind the lens. "Y" is positive when above the principal axis ($P_A$) and negative when below.

$Y_m$ The perpendicular distance from the principal axis ($P_A$) to the mid point of a sensor surface.

$Y_{vis}$ The distance from the visible range sensor mid point to its edge.

$y_{IR}$ The distance from the infra-red range sensor mid point to its edge.

$\theta$ The angle that any light ray makes relative to the principal axis ($P_A$). Behind the principal point ($P_p$) "$\theta$" is positive above the principal axis ($P_A$) and negative below. The reverse is true in front of the principal point ($P_p$).

$\theta_b$ The angle at which the bottom light ray ($r_b$) enters the front of the lens.

$\theta_m$ The angle at which the sensor mid point light ray ($r_m$) passes through the principal point ($P_p$).

$\theta_t$ The angle at which the top light ray ($r_t$) enters the front of the lens.

$\theta_{bmax}$ The maximum angle that a ray entering the bottom of the lens will impinge on the surface of a finite sensor.

$\theta_{bmin}$ The minimum angle that a ray entering the bottom of the lens will impinge on the surface of a finite sensor.

$\theta_{tmax}$ The maximum angle that a ray entering the top of the lens will impinge on the surface of a finite sensor.

$\theta_{tmin}$ The minimum angle that a ray entering the top of the lens will impinge on the surface of a finite sensor.

$\phi$ The nominal lens aperture diameter. This is usually assumed to be equal to the actual lens diameter.

$\lambda_o$ The nominal design wavelength of a lens as specified by the manufacturer.

$\lambda$ The actual wavelength.

We claim:

1. Flame detection apparatus, comprising:

(a) a dual colour sensor for sensing radiation emissions in the visible frequency band from a first zone, for sensing radiation emissions in the infrared frequency band from a second zone, and for producing first and second output signals representative of said sensed emissions;

(b) a lens optically coupled to said sensor; and, (c) means for adjusting said optical coupling such that said first and second zones coincide within a selected region and diverge outside said region.

2. Flame detection apparatus as defined in claim 1, further comprising a plurality of said sensors, each optically coupled to said lens at selected lateral displacements off said lens' principal axis.

3. Flame detection apparatus as defined in claim 2, further comprising fibre optic coupling means for optically coupling said lens to said sensors.

4. Flame detection apparatus as defined in claim 3, further comprising cooling means for cooling said lens and said sensors.

5. Flame detection apparatus as defined in claim 4, wherein said means for adjusting said optical coupling between said sensor and said lens comprises a first barrel for mounting said sensors and a second barrel for mounting said lens, said barrels being telescopically interconnected to vary the longitudinal displacement between said sensors and said lens by slidable displacement of said barrels relative to one another.

6. Flame detection apparatus as defined in claim 5, wherein said cooling means comprises an air passage for conveying cooling air through said barrels, over said sensors and said lens.

7. Flame detection apparatus as defined in claim 3, further comprising flexible mounting means for mounting said sensors and said lens to permit flexible displacement of said sensors relative to said lens.

8. Flame detection apparatus as defined in claim 2, wherein said sensors are selected from the group consisting of:

(a) silicon lead sulphide sensors;
(b) silicon lead selenide sensors; and,
(c) silicon germanium sensors.

9. Flame detection apparatus as defined in claim 8, wherein said lens is sapphire.

10. Flame detection apparatus as defined in claim 3, wherein said fibre optic coupling means is zirconium fluoride.

11. Flame detection apparatus as defined in claim 2, further comprising aperture restricting means for restricting the apparent diameter of said lens relative to said sensors.

12. Flame detection apparatus as defined in claim 2, further comprising signal processing means for receiving said sensor output signals and for selecting a pair of said signals produced by a selected one of said sensors.

13. Flame detection apparatus as defined in claim 11, wherein said signal processing means further comprises:

(a) a multiplexer for receiving said first and second output signals from each of said sensors;
(b) a tone decoder electrically coupled to said multiplexer, said tone decoder for detecting preselected tone signals, each tone signal corresponding to one of said sensors, and for applying one of a corresponding number of select signals to said multiplexer upon detection of any of said tone signals to cause said multiplexer to pass said first and second output signals produced by said sensor corresponding to said detected tone signal.

14. Flame detection apparatus as defined in claim 11, wherein said signal processing means further comprises a voltage controlled gain stage for preventing signal saturation when said first and second output signals are produced by bright flame or high flicker flame in said selected region.

15. Flame detection apparatus as defined in claim 11, wherein said signal processing means further comprises filter means for filtering said first and second output signals, said filter means having a frequency proportional gain characteristic.

* * * * *